United States Patent
Ellis et al.

(10) Patent No.: US 10,778,943 B2
(45) Date of Patent: Sep. 15, 2020

(54) AUTONOMOUS SURVEILLANCE DUO

(71) Applicant: C-Tonomy, LLC, Camas, WA (US)

(72) Inventors: Stephen W. Ellis, Camas, WA (US); Basil I. Jesudason, Portland, OR (US); John E. Dolan, Vancouver, WA (US)

(73) Assignee: C-Tonomy, LLC, Camas, WA (US)

( * ) Notice: Subject to any disclaimer, the term of this patent is extended or adjusted under 35 U.S.C. 154(b) by 113 days.

(21) Appl. No.: 16/215,161

(22) Filed: Dec. 10, 2018

(65) Prior Publication Data
US 2020/0029054 A1 Jan. 23, 2020

Related U.S. Application Data

(60) Provisional application No. 62/699,024, filed on Jul. 17, 2018.

(51) Int. Cl.
| | |
|---|---|
| *H04N 7/18* | (2006.01) |
| *B25J 9/16* | (2006.01) |
| *H02S 10/40* | (2014.01) |
| *H02J 7/00* | (2006.01) |
| *G05D 1/02* | (2020.01) |

(52) U.S. Cl.
CPC ............ *H04N 7/185* (2013.01); *B25J 9/1679* (2013.01); *G05D 1/0225* (2013.01); *H02J 7/0027* (2013.01); *H02S 10/40* (2014.12)

(58) Field of Classification Search
CPC ........ H04N 7/185; H02S 10/40; B25J 9/1679; G05D 1/0225; H02J 7/0027
See application file for complete search history.

(56) References Cited

U.S. PATENT DOCUMENTS

| | | | |
|---|---|---|---|
| 7,340,076 B2 | 3/2008 | Stach et al. |
| 7,925,049 B2 | 4/2011 | Zhu et al. |
| 8,022,812 B2 | 9/2011 | Beniyama et al. |
| 8,134,479 B2 | 3/2012 | Suhr et al. |
| 8,174,568 B2 | 5/2012 | Samarasekera et al. |
| 8,238,612 B2 | 8/2012 | Susca et al. |
| 8,340,901 B2 | 12/2012 | Fahn et al. |
| 8,447,863 B1 | 5/2013 | Francis, Jr. et al. |
| 8,655,513 B2 | 2/2014 | Vanek |
| 8,660,736 B2 | 2/2014 | Chen et al. |
| 8,661,605 B2 | 3/2014 | Svendsen et al. |
| 8,663,130 B2 | 3/2014 | Neubach et al. |
| 8,705,842 B2 | 4/2014 | Lee et al. |
| 8,718,838 B2 | 5/2014 | Kokkeby et al. |
| 8,825,387 B2 | 9/2014 | Mays et al. |
| 8,874,360 B2 | 10/2014 | Klinger et al. |
| 8,918,241 B2 | 12/2014 | Chen et al. |
| 8,929,604 B2 | 1/2015 | Platonov et al. |
| 8,937,410 B2 | 1/2015 | Comins et al. |
| 9,026,272 B2 | 5/2015 | Kokkeby et al. |
| 9,117,371 B2 | 8/2015 | Hutchings |
| 9,157,757 B1 | 10/2015 | Liao et al. |
| 2004/0167667 A1 | 8/2004 | Goncalves et al. |
| 2006/0055530 A1 | 3/2006 | Wang et al. |
| 2006/0056707 A1 | 3/2006 | Suomela et al. |
| 2006/0058921 A1 | 3/2006 | Okamoto |
| 2007/0027579 A1 | 2/2007 | Suzuki et al. |
| 2007/0061041 A1 | 3/2007 | Zweig |

(Continued)

*Primary Examiner* — Tsion B Owens
(74) *Attorney, Agent, or Firm* — Chernoff, Vilhauer, McClung & Stenzel, LLP

(57) ABSTRACT

A surveillance duo that includes a pod and a rover.

25 Claims, 30 Drawing Sheets

(56) References Cited

U.S. PATENT DOCUMENTS

| | | |
|---|---|---|
| 2007/0100498 A1 | 5/2007 | Matsumoto et al. |
| 2007/0188328 A1 | 8/2007 | Mochizuki et al. |
| 2007/0271003 A1 | 11/2007 | Bang et al. |
| 2008/0077511 A1 | 3/2008 | Zimmerman |
| 2009/0012667 A1 | 1/2009 | Matsumoto et al. |
| 2009/0074545 A1 | 3/2009 | Lert, Jr. et al. |
| 2009/0207257 A1 | 8/2009 | Jung et al. |
| 2010/0076631 A1 | 3/2010 | Mian |
| 2010/0155156 A1 | 6/2010 | Finkelstein |
| 2011/0106312 A1 | 5/2011 | Chen et al. |
| 2012/0121161 A1 | 5/2012 | Eade et al. |
| 2013/0231779 A1 | 9/2013 | Purkayastha et al. |
| 2016/0026192 A1* | 1/2016 | Phillips ............... E21B 47/00 348/143 |
| 2017/0094144 A1* | 3/2017 | Tomomasa ........... B60L 50/50 |
| 2018/0005534 A1 | 1/2018 | Jesudason et al. |
| 2019/0043355 A1 | 2/2019 | Ferguson et al. |
| 2019/0373222 A1* | 12/2019 | Chiu .................... H04L 67/12 |

\* cited by examiner

AUTONOMOUS SURVEILLANCE DUO

CROSS-REFERENCE TO RELATED APPLICATIONS

This patent application claims the benefit of U.S. Provisional Patent Application No. 62/699,024, filed Jul. 17, 2018, which is incorporated herein by reference in its entirety.

BACKGROUND OF THE INVENTION

The present invention relates to surveillance devices.

Historically, visual surveillance systems were designed as permanent additions to existing site infrastructure, and they were intended to protect assets and monitor activity in and around buildings and grounds by adding audio-video capture. They typically would extend existing security installations (comprised of specialty sensors for contact, motion, heat, chemicals, water, etc.), but they might also entail entirely new custom installations. Because of the significant investment of time and complexity of installing, such systems were generally permanent and unchanging without major redesign. As a result, cameras needed to be carefully placed at predefined, strategic locations within or on buildings or on poles and other structures that could provide good vantage points. And until recently sensors were hardwired to data collection nodes and monitoring centers, so reconfiguration was difficult and time consuming.

One advantage of such fixed-location/stationary camera installations is that camera positions can be precisely known, and therefore the relative positions of objects and events detected in the scene can be precisely inferred. Temporal synchronization is relatively straightforward as cameras operate on a common clock. And knowing the exact positions of cameras relative to one another facilitates reliable integration of events moving between the fields-of-view (FOVs) of different cameras.

The advent of low-cost, hi-res digital cameras and the emergence of robust wireless broadband technologies such as WiFi and 4G/5G enable more flexible positioning and repositioning of cameras. However, stationary cameras remain susceptible to occlusions (both permanent and transitory), adverse lighting effects (such as glare and shadowing), and lack of sufficient resolution at distance. As a consequence, some modern surveillance systems have come to incorporate mobile cameras—i.e., cameras mounted on moving platforms—which can provide more comprehensive data gathering and more detailed views of a particular area or situation.

Mobile platforms may be distinguished according to their navigation control paradigm (manually driven, tele-operated, or autonomously driven) and according to their operating environment (air, land, or sea). Waterborne vehicles are generally an exclusive concern of naval operations and have a different set of concerns from autonomous ground vehicles (AVGs). While airborne vehicles might ultimately enhance site surveillance, they are currently subject to shifting FAA regulations and local-varying legal operating restrictions.

Mobile camera platforms are capable of moving closer to events as needed and to attain better vantage points as circumstances permit. However it remains a major challenge to determine the exact location of the mobile platform and its cameras at any instant, especially while moving. While significant progress has been made using modern techniques such as sensor-fusion and SLAM (Simultaneous Localization and Mapping), large uncertainties can still be present due to drift of inertial sensors and lack of sufficient positional resolution of public GPS.

This lack of accurate positioning has prompted some vendors to develop and install proprietary differential positioning systems. But such proprietary differential positioning systems tend to be site-specific and are therefore brittle and costly to deploy. More recently, some vendors have announced visual surveillance products that are stationary or mobile, but these are not tightly integrated into a unified solution. They typically act as independent components with specific duties applicable to specific situations, and any integration happens through the backend.

More recently, there has been activity in so-called robot swarms. This trend has found particular appeal in the unmanned airborne vehicle (UAV) arena, and it can be viewed as an extension of classic parallel processing paradigms (in particular, SPMD—Single Program Multiple Data—models) to robotics. Swarms are generally motivated by biological examples (ants, bees, etc.), where multiple identical agents with the same capabilities realize a multiplicative advantage by each working on a small chunk of the problem. In surveillance, this typically means sub-regions of the area to be surveilled would be assigned to swarm members in 1-to-1 or 1-to-many-fashion.

Needless to say, coordination of a swarm's tasking can be complex. More significantly, since all agents have the same capabilities (both strengths and weaknesses), the swarm is not able to directly compensate for individual shortcomings. Instead, the swarm works through redundancy of effort, seeking to overwhelm the problem through brute-force rather than exploiting complementary capabilities. In addition, the swarm approach does not explicitly embody a means to rapidly deploy to a given site.

The foregoing and other objectives, features, and advantages of the invention will be more readily understood upon consideration of the following detailed description of the invention, taken in conjunction with the accompanying drawings.

Figure 1:
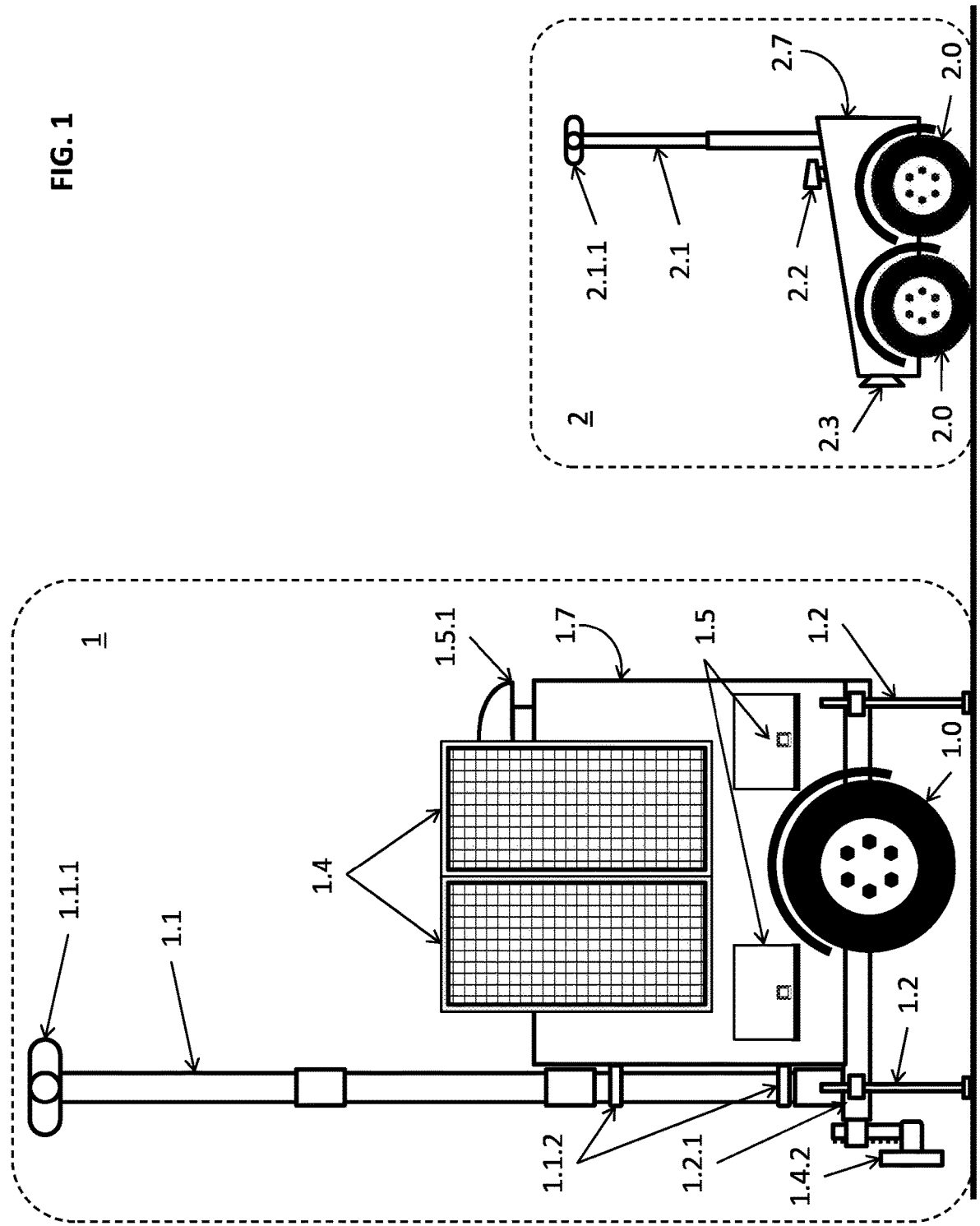
FIG. 1 illustrates a duo fully deployed.

or otherwise desirable to erect the mast (or even to add masts) at central or port positions, these variations should be considered equivalent insomuch as they provide good coverage for the pod's sensors.

In the figures, curved arrows refer to elements that are hidden or interior to what is shown, while straight arrows refer directly to what is visible. For assistance, a figure labelling taxonomy is provided in the following tables. This consists of leading "agent" labels and trailing "element" labels. Substituting 1 for x in the leading position refers to a pod element; substituting a 2 refers to a rover element. Thus, 1.1 indicates the pod sensor mast, while 2.1 indicates the rover sensor mast.

TABLE 1

Figure Labels.

| Trailing Labels | Leading Labels | | |
|---|---|---|---|
| | 1 | 2 | 0 |
| x | Pod | Rover | Service Vehicle |
| x.0 | Trailing Wheels | Drive Motor Wheel Assembly | X |
| x.0.1 | Pod Fender | Rover Fender | X |
| x.1 | Sensor Mast | Sensor Mast | X |
| x.1.1 | Sensor Cap | Sensor Cap | X |
| x.1.2 | Sensor Mast Restraining Bracket | X | X |
| x.1.3 | Mast Guy Wire | X | X |
| x.1.3.1 | Mast Guy Wire Deck Anchor | X | X |
| x.1.3.2 | Mast Guy Wire Roof Anchor | X | X |
| x.1.4 A/B | Sensor Mast Join | X | X |
| x.2 | Stabilizing Pedestal | Stereo Cameras | X |
| x.2.1 | Forward Pod Deck | Stereo Rig Rail System | X |
| x.3 | X | Front Driving Lights | X |
| x.3.1 | Tail Lights | Backup Lights | X |
| x.3.2 | X | Front Driving Light Cowlings | X |
| x.4 | Mounted Solar Panel | X | X |
| x.4.1 | Optional Roof Solar Panel | Optional Roof Solar Panel | X |
| x.4.2 | Proximity Charging Plate | Proximity Charging Plate | X |
| x.4.2.1 | Charging Plate Adjustment Bracket | X | X |
| x.4.3 | Solar Panel Mounting Bracket | X | X |
| x.5 | Lower Convection Cooling Covers | X | X |
| x.5.1 | Upper Convection Exhaust Cap | X | X |
| x.6 | Pod Tow Tongue | X | Service Vehicle Tow Hitch |
| x.6.1 | Pod Tow Tongue Dolly Wheel | X | X |
| x.6.2 | Pod Chassis Receiver Channel | X | X |
| x.7 | Pod Cargo Bay | Rover Body Capsule | X |
| x.8 | Inclined Cargo Bay Floor | X | X |
| x.8.1 | Rear Door Ramp | X | X |
| x.8.1.1 | Track Guide Rails | X | X |
| x.8.2 | Rear Door Latch | X | X |
| x.9 | Cargo Winch | X | X |
| x.9.1 | Cargo Winch Cable | Front Winch Eyelet | X |
| x.9.2 | Rear Restraining Strap | Rear Tie Down Eyelet | X |

DETAILED DESCRIPTION OF PREFERRED EMBODIMENT

The following figures serve to illustrate various embodiments. It should be noted that modifications of size, placement, numbers of elements, etc. may be used to provide similar functionality. So for example, the one embodiment shows the pod employing a 3-sectioned sensor mast. But a 2-sectioned or single-sectioned sensor mast should be considered essentially equivalent as they are both intended to provide an advantageous viewpoint for the pod's surveillance sensors. The mast could also be telescoping, allowing for more rapid deployment in time-critical situations. Likewise, the erected mast is shown located on the forward deck in the starboard position. If it is deemed more advantageous

TABLE 2

Figure Labels (continued).

| Trailing Labels | Leading Labels | | |
|---|---|---|---|
| | 1 | 2 | 0 |
| x | Pod | Rover | Service Vehicle |
| x.10 | RTK GPS Base Station | RTK GPS Transceiver | X |
| x.11 | Surveillance Camera Rig | Surveillance Camera Rig | X |
| x.11.1 | 360° Omni-Camera | 360° Omni-Camera | X |
| x.11.2 | 360° Field of View | 360° Field of View | X |
| x.11.3 | Weather Cap | Weather Cap | X |
| x.12 | Surveillance Lighting Rig | Surveillance Lighting Rig | X |

TABLE 2-continued

Figure Labels (continued).

| Trailing Labels | Leading Labels | | |
|---|---|---|---|
| | 1 | 2 | 0 |
| x.12.1 | Multi-Lamp Lamp Assembly | Multi-Lamp Lamp Assembly | X |
| x.12.2 | Overlapping Flood Fields | Overlapping Flood Fields | X |
| x.12.3 | Weather Cap | Weather Cap | X |

In general, the system includes a heterogeneous pair of autonomous agents, with complementary functionality, termed an Autonomous Surveillance Duo. A duo typically consists of a stationary surveillance platform termed a pod and a mobile surveillance platform termed a rover. The duo supports rapid and flexible deployment for ad-hoc surveillance situations, but it also supports seamless, flexible integration with existing security installs. The pod has a cargo bay, which houses hardware components integral to the pod's mission, including: electrical charging and storage units; computational and communication units; and environmental maintenance components, such as cooling fans. The bay also houses the rover itself during transport, and an integral trailer chassis with detachable tongue allows both the pod and the rover to be easily hauled by a service vehicle to the surveillance site. Once setup and calibrated, the pair is able to perform autonomous, joint surveillance of a designated zone on site. The respective strengths of each agent enhance the capabilities of the other. Thus, the precise geo-referencing of the pod's position assists in accurately locating the rover as it moves. And the rover's ability to move about and gain advantageous imaging positions provides a more complete assessment of the state of the zone than would otherwise be possible from a single stationary vantage point.

The pair of autonomous agents enables effective ad-hoc visual surveillance, which can be rapidly deployed and readily reconfigured.

The pair of autonomous agents may be used as "permanent" enhancements of existing/legacy surveillance installs (with expected service on the order of years).

The pair of autonomous agents may be used as semi-permanent surveillance of limited-duration events such as monitoring construction sites (with expected service on the order of months).

The pair of autonomous agents may be used as temporary surveillance of short-term, planned events such as outdoor concerts, fairs, etc. (with expected service on the order of days.

The pair of autonomous agents may be used as rapid-response deployment to surveil unplanned, emergency situations such as crime scenes or accident scenes (with expected service on the order of hours).

Rover autonomy facilitates programmatic coordination with its pod partner for successful duo surveillance. This permits security/surveillance personnel to attend to higher-level tasks rather than having to directly operate the rover, and in some cases it may reduce the number of personnel required.

Referring to FIG. 1, a fully deployed pod 1 is shown with a sectioned mast 1.1 erected on a forward deck 1.2.1 and with a detachable sensor cap 1.1.1 mounted atop mast. The mast is preferably hollow with cables running up the center to provide power and data linkage to the cap. The mast is preferably telescoping so that it may have an extended and a retracted state. Restraining brackets 1.1.2 may be used to secure the mast to the pod frame. Stabilizing pedestals 1.2, one per corner, are extended to raise and level the pod base. This minimizes pod motion and prevents rolling by having the trailing wheels 1.0 off the ground. Preferably, the pedestals employ ratcheted pillars or screw jacks so that each pod corner can be incrementally jacked up or down to efficiently raise and level the pod. The pod's charging plate assembly 1.4.2 is mounted into the chassis receiver channel and connected to the pod's charging subsystem. Vertical solar panels 1.4 are mounted and oriented with adjustable side brackets, and they too are connected to the charging system. Lower side awning vents 1.5 are swung open to enable convection cooling via an upper convection exhaust vent 1.5.1 located atop the pod roof. The pod's interior cargo bay 1.7 is also indicated. The bay houses the secured rover during transport. It is also the location for all of the pod's hardware subsystems for surveillance, communications, and power management.

A fully deployed rover 2 is shown with its telescoping mast 2.1 raised and its sensor cap 2.1.1 mounted atop the mast. Here again the mast is hollow so that cables can be run up the center to provide power and data linkage to the cap. A stereo SLAM camera rig 2.2, located forward of the sensor mast, provides visual navigation input. Forward driving lights 2.3 are located at the front of the rover. The rover's body capsule 2.7 is also indicated. The rover 2 has a set of four wheels 2.0. The capsule houses all of the rover's hardware subsystems for surveillance, communications, navigation, and power management.

Figure 2:
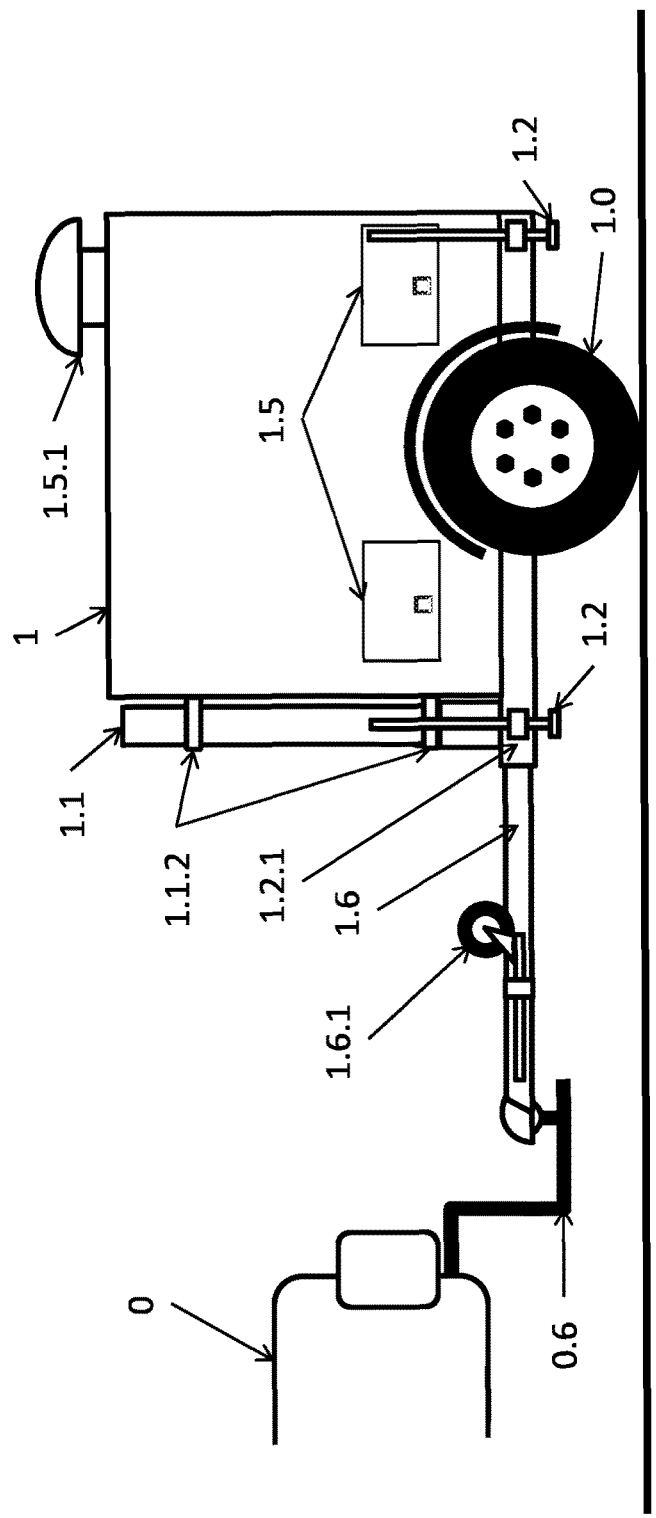
FIG. 2 illustrates the duo in transport mode.

Referring to FIG. 2, a side elevation of pod 1 is shown in transport mode, riding on its trailing wheels 1.0 and hitched to a service vehicle 0. Mast sections 1.1 are secured on the forward deck 1.2.1 by restraining brackets 1.1.2 for travel. Stabilizing pedestals 1.2 are retracted and locked up. Lower side awning vents 1.5 are closed and latched for travel. An upper convection exhaust 1.5.1 is shielded from elements by a top cap, and an inside plug/baffle is sealed to prevent ingesting dirt during travel. The pod's detachable towing tongue 1.6 is inserted and locked into the pod's chassis receiver channel at the front of the forward deck 1.2.1, and it is attached to service vehicle's tow hitch 0.6. The tongue's dolly wheel 1.6.1 is retracted and locked up for travel.

Figure 3:
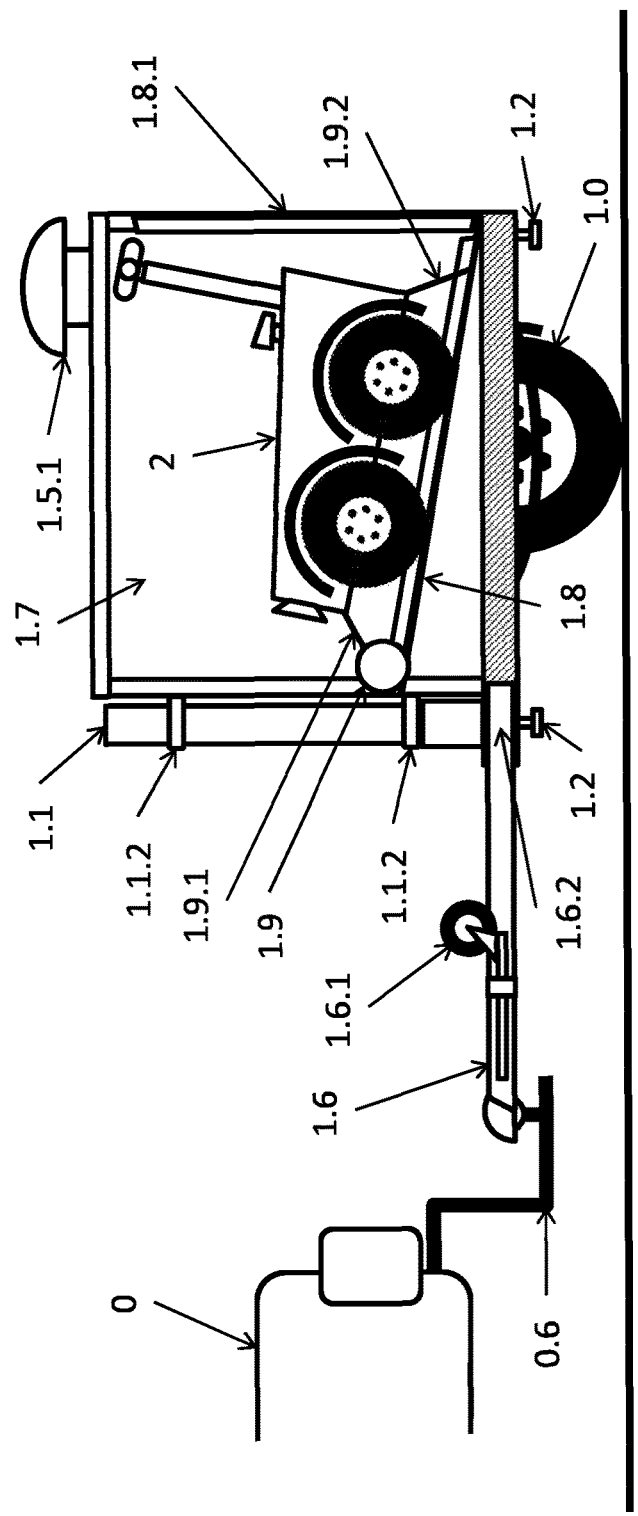
FIG. 3 illustrates the duo with a cross section of a pod bay with a rover secured for transport.

Referring to FIG. 3, a cross-section of pod bay with rover secured for transport is illustrated. The rover 2 is illustrated as stowed in the pod cargo bay 1.7. The bay floor 1.8 is sloped upward at its forward end to facilitate rolling the rover out of the rear ramp door 1.8.1 when it is lowered. In this view, the ramp door is shown in its locked up position for travel. The rover is towed into the bay by the pod's forward winch 1.9, and it is secured for travel at its forward end by a tensioned winch cable 1.9.1 and at its rear end by a tightened ground strap 1.9.2. The pod's towing tongue 1.6 is shown locked into the pod's chassis receiver channel 1.6.2 at its rear end and attached to service vehicle's ball hitch 0.6 at its front end. The corner stabilizing pedestals 1.2 and tongue dolly wheel 1.6.1 are locked up for travel, and the pod rests on its trailing wheels 1.0.

Figure 4:
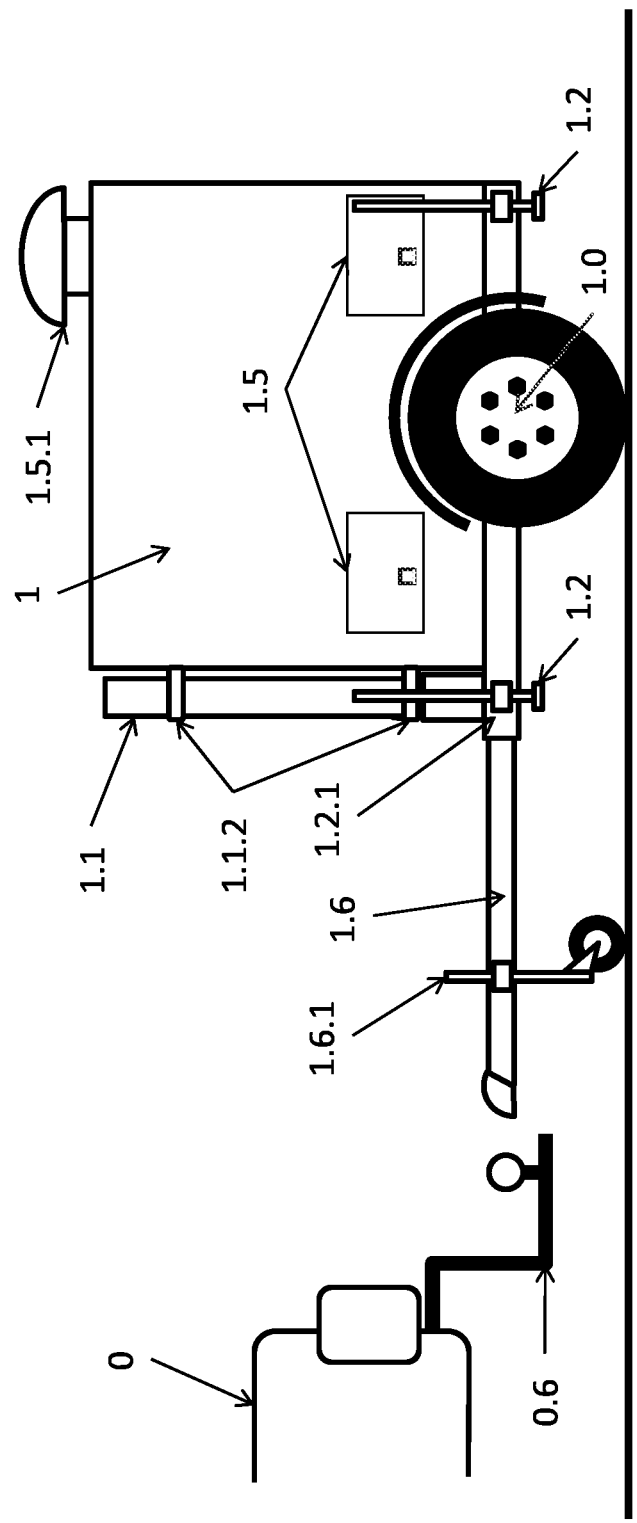
FIG. 4 illustrates a side view of the duo in dolly mode.

Referring to FIG. 4, a side view of the dolly is shown. FIG. 4 is similar to FIG. 2, but with the pod's rotating tongue dolly wheel 1.6.1 lowered and the pod's tow tongue 0.6 unhitched. With the pod resting on its trailing wheels 1.0 and the lowered dolly wheel 1.6.1, the duo can be moved by manually pushing/pulling and turning as required to position and orient the pod in its ideal pose.

Figure 5A:
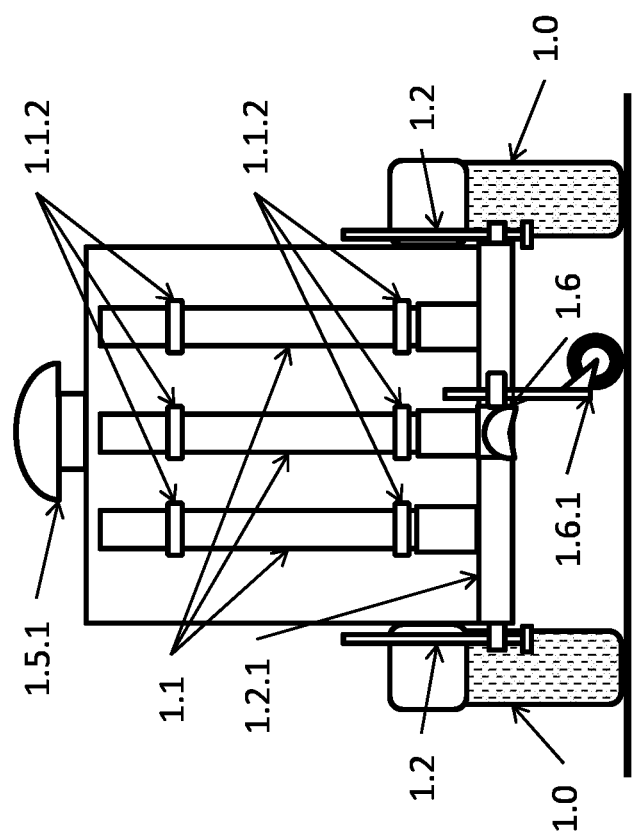
FIG. 5A and FIG. 5B illustrate a front view and a rear view of the duo in dolly mode.
Figure 5B:
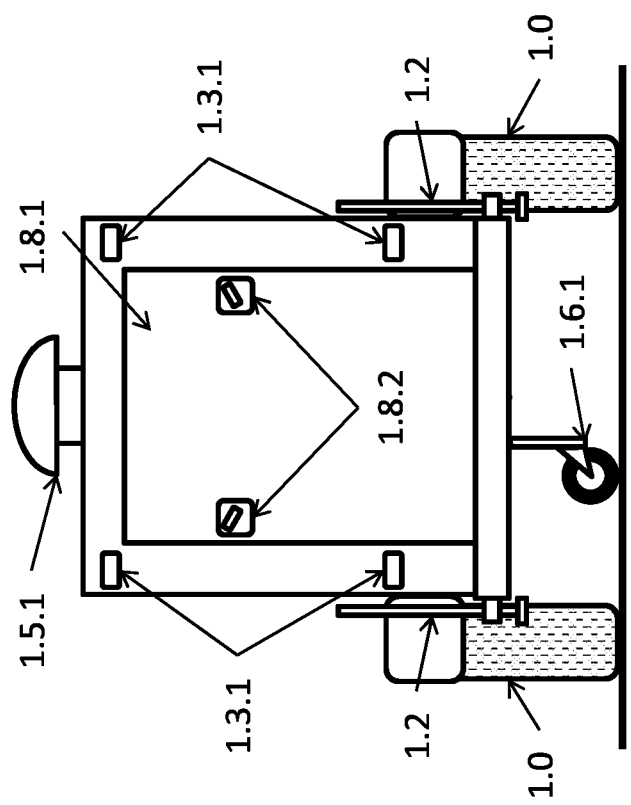

Referring to FIGS. 5A and 5B, a front elevation and a rear elevation of the duo in dolly mode is shown. The front elevation of FIG. 5A shows the three sections of the sensor mast 1.1 unassembled and secured on the forward deck 1.2.1 by restraining brackets 1.1.2. In dolly mode, the pod rests on its trailing wheels 1.0 and the dolly wheel 1.6.1 of the tow tongue 1.6. The two front stabilizing pedestals 1.2 are retracted and locked in the up position. The convection exhaust vent 1.5.1 is also visible atop the pod.

The rear elevation of FIG. 5B again shows the pod resting on its trailing wheels 1.0 and the dolly wheel 1.6.1, and the two rear stabilizing pedestals 1.2 are retracted and locked in the up position. The rear door ramp 1.8.1 is shown in its up and locked position, and it is secured by the rear door latches 1.8.2. The upper and lower tail lights 1.3.1 are also shown. These are the typical trailer light combination of travel lamp, brake light, turn signal, and backup light. Here again, the convection exhaust vent 1.5.1 is visible atop the pod.

Figure 6:
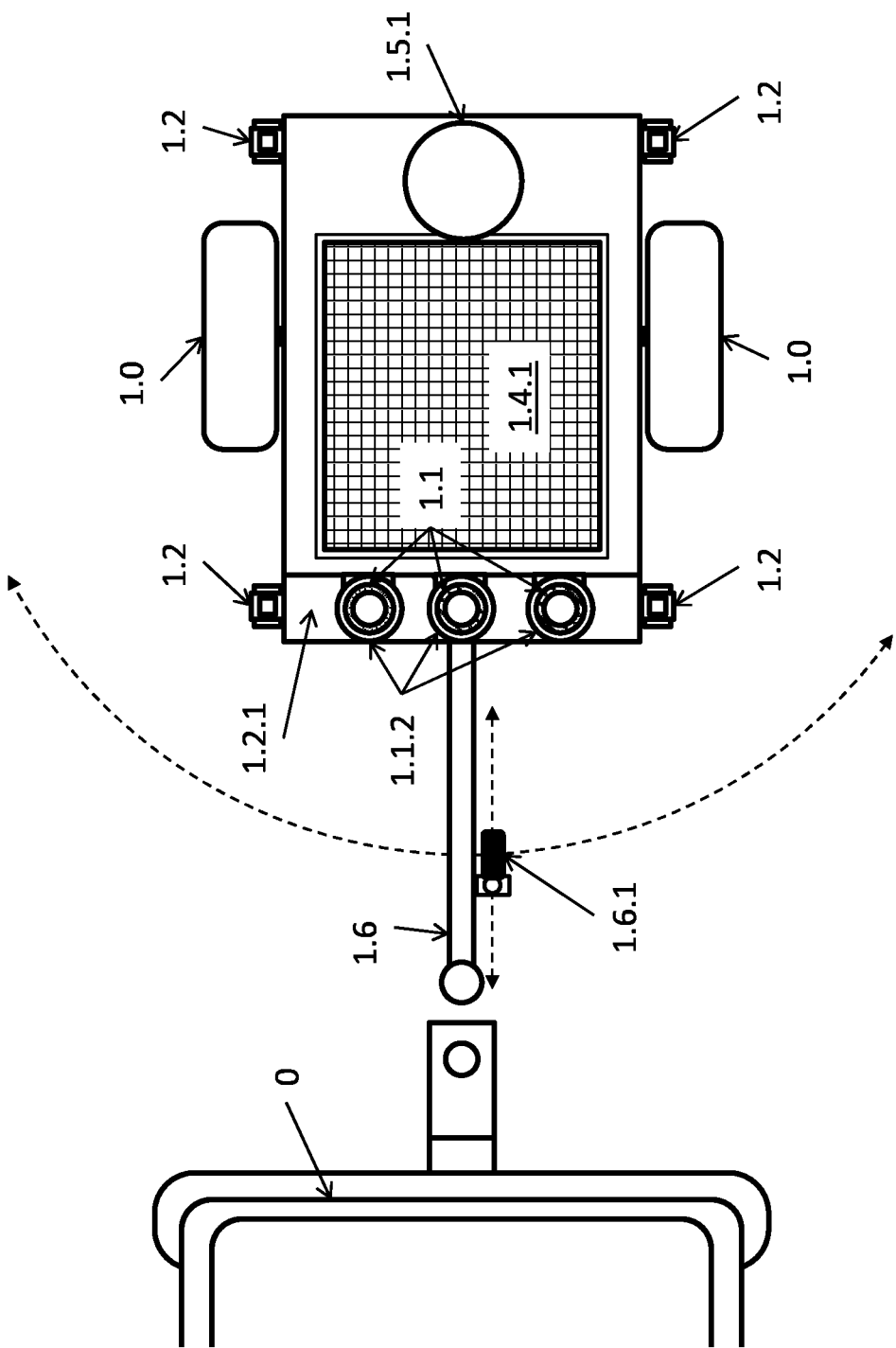
FIG. 6 illustrates a top view of the duo in dolly mode.

Referring to FIG. 6, a top view of the duo in dolly mode is shown. The duo (with the rover still secured inside the pod cargo bay) is shown from above in dolly mode—i.e., with the pod resting on its trailing wheels 1.0 and the tow tongue's 1.6 dolly wheel 1.6.1. This view illustrates how the duo may be manually repositioned and reoriented (dashed arrows) by pushing or pulling or swinging the tongue 1.6. The hollow mast sections 1.1 are secured on the forward deck 1.2.1 by restraining brackets 1.1.2, and are shown in cross-section to reveal the brackets, which are themselves anchored to the pod's forward wall. A solar roof panel 1.4.1 is also shown.

Figure 7:
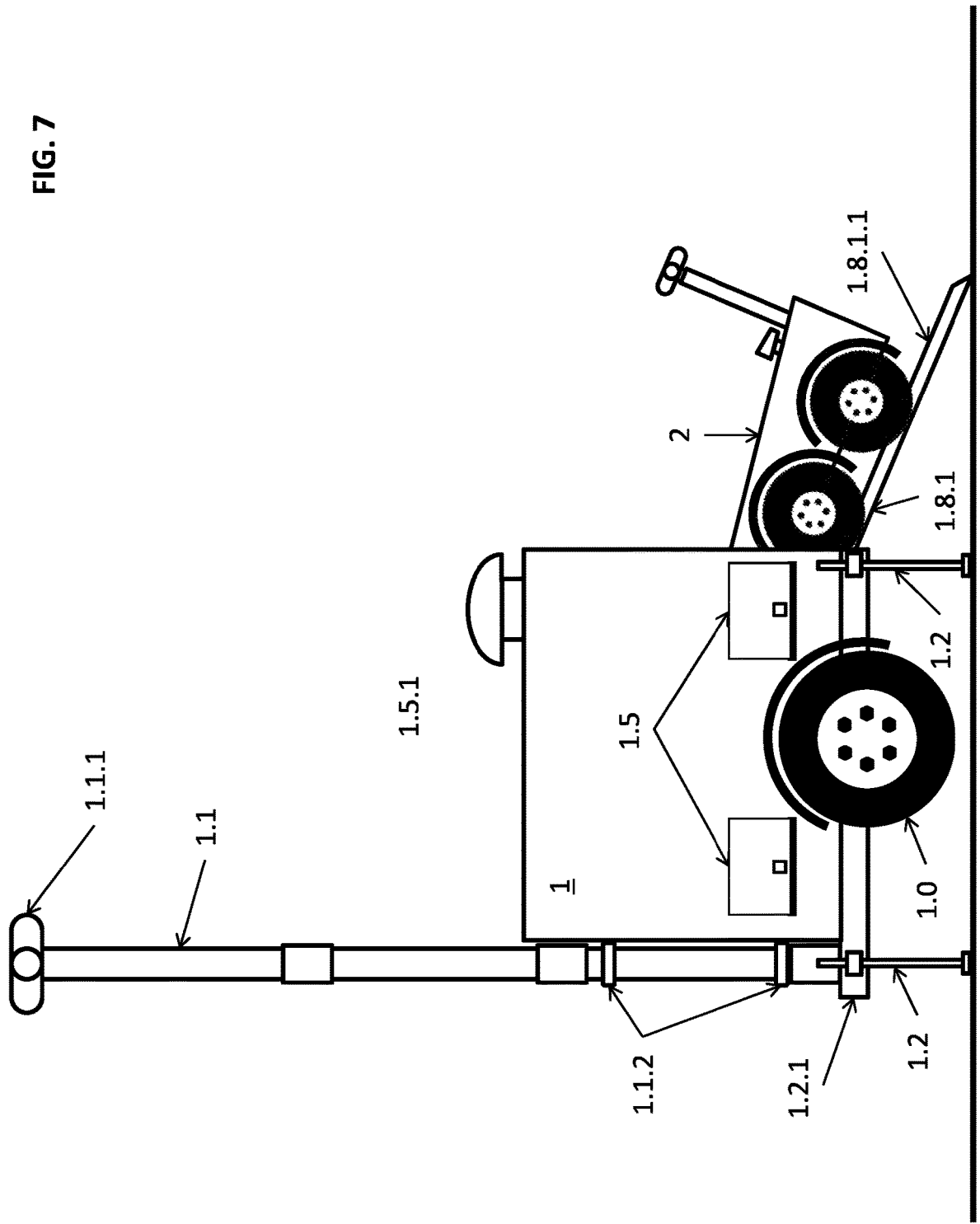
FIG. 7 illustrates the duo with the pod stabilized and the rover unloading.

Referring to FIG. 7, a pod stabilized with rover being unloaded is shown. The pod is shown raised and leveled on its corner stabilizing pedestals 1.2. The pod's mast 1.1 has been erected with its sensor cap 1.1.1 mounted. The pod's rear door 1.8.1 is lowered and acts as a ramp for unloading the rover 2. Longitudinal inner-track rails 1.8.1.1 guide the rover wheels 2.0 along their inner sidewalls during the process, thereby preventing the rover from hitting the door jamb or slipping off either side of the ramp. They also provide additional stiffness to the ramp door, allowing it to be lighter weight. The lower side awning vents 1.5 have been swung open to enable convection cooling.

Figure 8A:
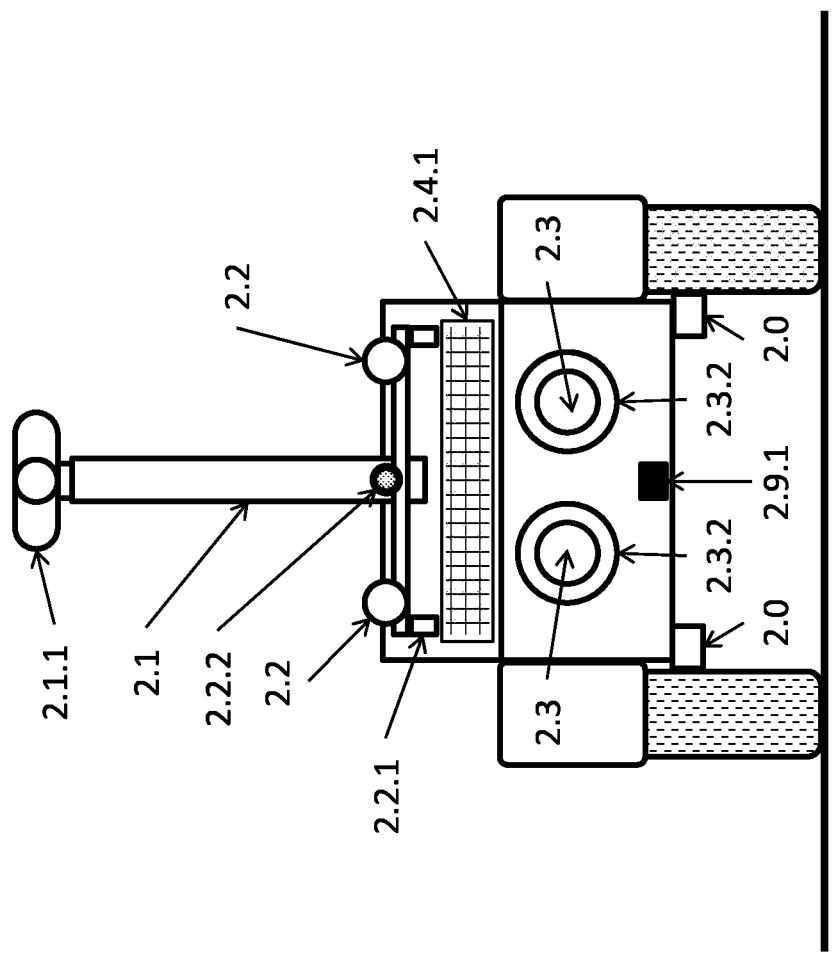
FIG. 8A and FIG. 8B illustrate a front elevation and a rear elevation of a deployed rover.
Figure 8B:
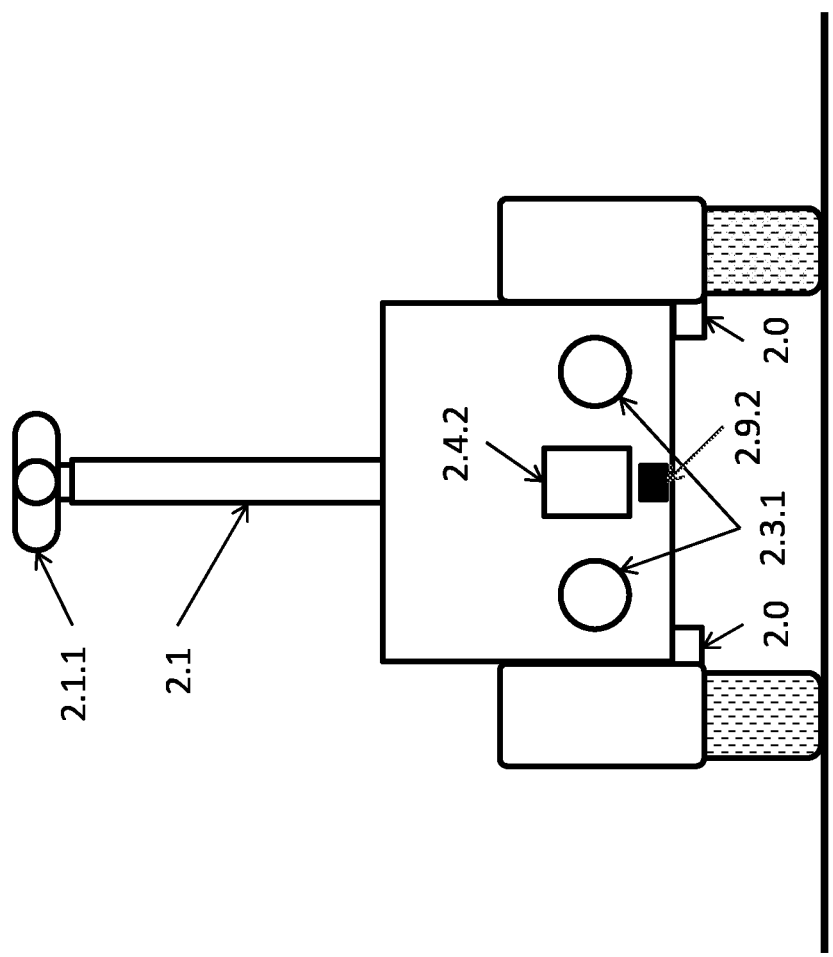

Referring to FIG. 8A and FIG. 8B, a front elevation and rear elevation of a deployed rover is shown. The front elevation of FIG. 8A shows the rover with its telescoping mast 2.1 lowered and with its sensor cap 2.1.1 mounted. The stereo visual navigation cameras 2.2 are shown mounted on the stereo rig rail 2.2.1, which allows them to be separated and secured along a variable baseline. An optional drive camera 2.2.2 is also shown mounted here at mid position along the rig rail. The drive camera provides a live, low-res video feed that enables teleoperation of the rover. Also shown are the front drive motor wheel assemblies 2.0, a set of front driving lights 2.3 with their cowlings 2.3.2, and a rover's front winch eyelet 2.9.1. In addition, the rover's optional roof solar panel 2.4.1 is visible.

The rear elevation of FIG. 8B shows the telescoping mast 2.1 lowered and with its sensor cap 2.1.1 mounted. It also shows the rear drive motor wheel assemblies 2.0, a set of rear backup lights 2.3.1, and the rover's rear tie down eyelet 2.9.2. Finally, the rover's proximity charging plate 2.4.2 is shown embedded in the lower mid portion of the back wall. All relevant elements on the rover's back wall are flush-mounted or recessed. The rear eyelet is a cutout exposing a section of chassis' lower strut, which can be hooked by the pod's rear tensioning strap to secure the rover during transport. The fact that the eyelet and the backup lights don't protrude, allows the rover to position its charging plate in very close proximity to the pod's charging plate.

Figure 9A:
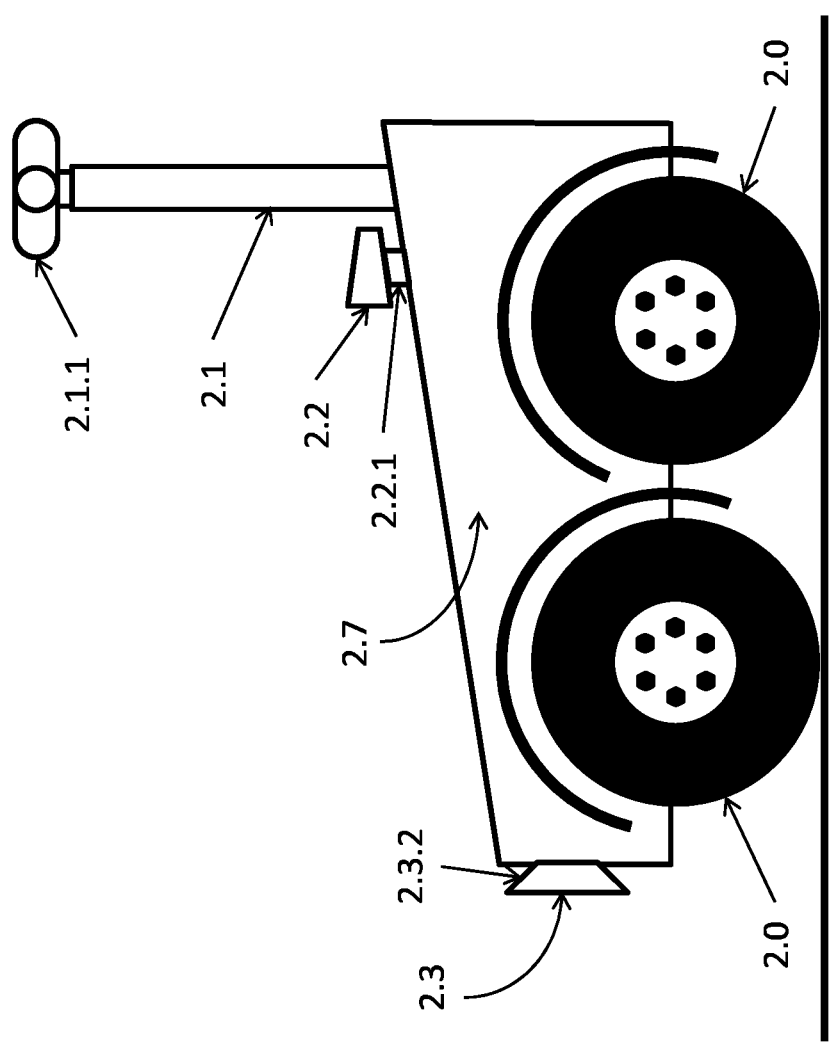
FIG. 9A and FIG. 9B illustrate a side elevation of a mast lowered and a mast raised of the deployed rover.
Figure 9B:
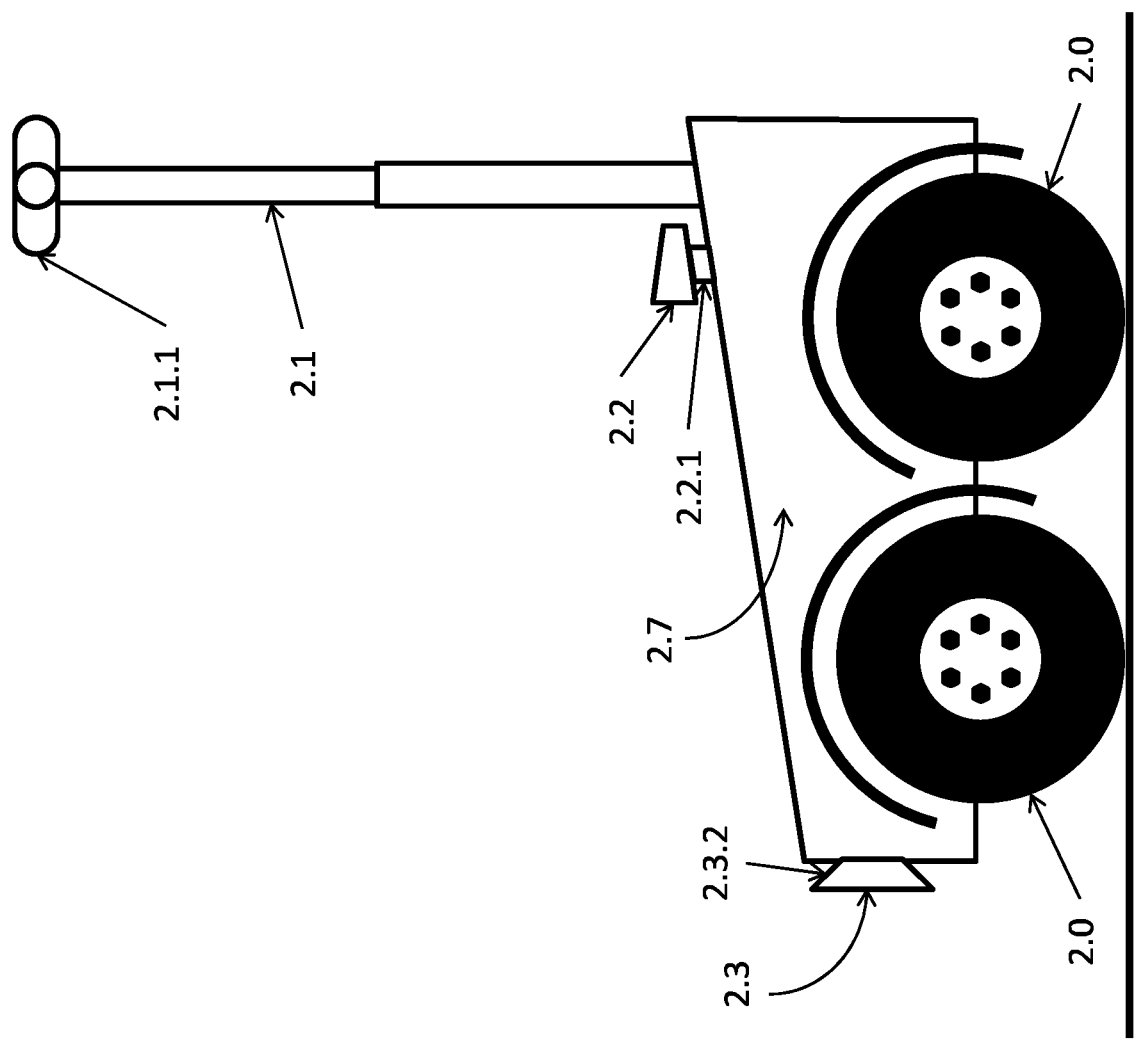

Referring to FIG. 9A and FIG. 9B, a side elevation of the deployed rover with the mast lowered and mast raised is shown. The elevation in FIG. 9A shows the rover resting on its drive wheels 2.0 with its mast 2.1 lowered and the sensor cap 2.1.1 mounted. As indicated above, interior of the rover's body capsule 2.7 houses all of its hardware subsystems for surveillance, communications, navigation, and power management. The rover's stereo rig rail 2.2.1 is shown with one of the navigation cameras 2.2 visible. The cowlings 2.3.2 of the front driving lights 2.3 are visible, but none of the elements on the rover's rear wall is visible, since they are all flush-mounted or recessed (as indicated above) in order to facilitate proximity charging.

The elevation in FIG. 9B show shows essentially the same information, but with the rover's telescoping sensor mast 2.1 in its fully raised position.

The front driving lights are shown with protruding cowlings both to indicate that shielding driving lights from weather and environmental elements is desirable and to assert that protrusion of elements at the vehicle's front is permitted, but not necessary. Thus, an alternative embodiment could employ recessed driving lights with lens covers.

Figure 10:
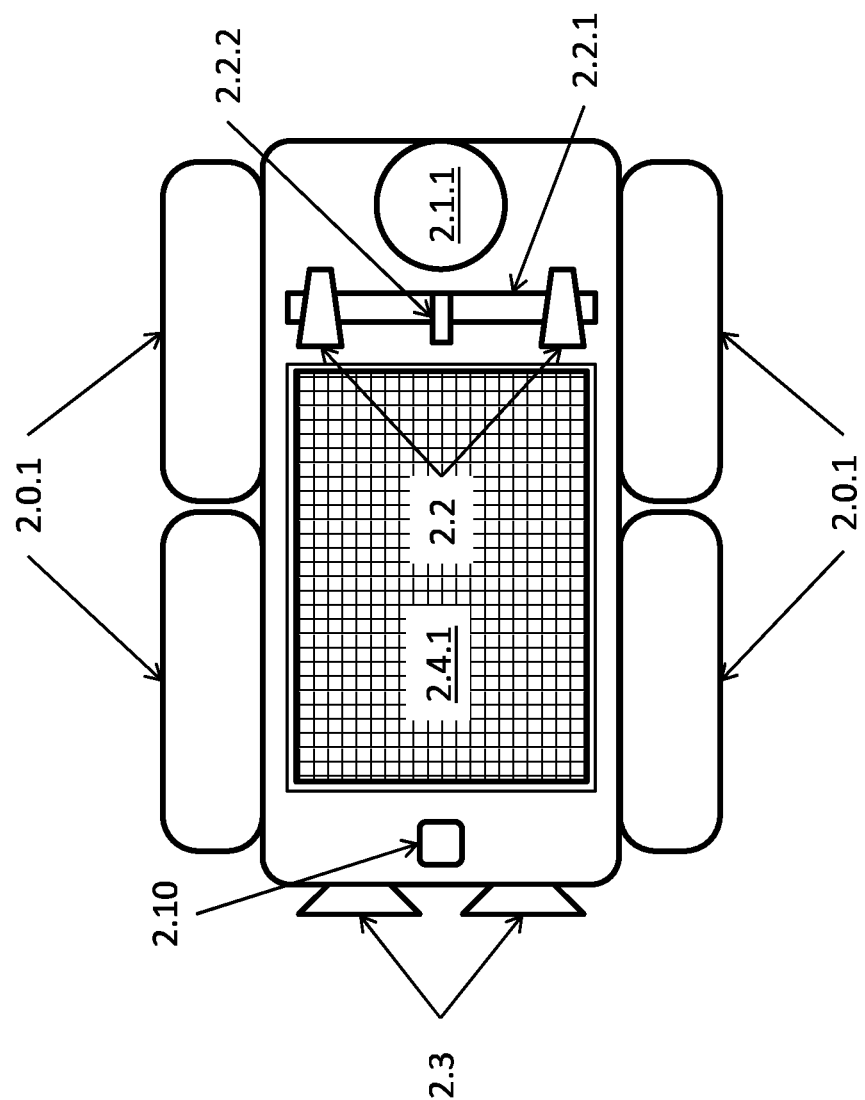
FIG. 10 illustrates a top view of the deployed rover.

Referring to FIG. 10, a top view of the deployed rover is shown. In this view, the stereo navigation cameras 2.2 are shown mounted at port and starboard positions along the stereo rig rail 2.2.1, and the drive camera 2.2.2 is mounted in the middle position. The four drive motor wheel assemblies 2.0 are hidden below their fenders 2.0.1. The rover's RTK GPS transceiver 2.10 is shown, as is the optional roof solar panel 2.4.1. The driving light cowlings 2.3.1 are visible at the front, and the rover's sensor cap 2.1.1 is shown at the rear. Note that the sensor cap is itself flush with the rear of the vehicle, again in order to allow the rover to position its charging plate in close proximity to that of the pod.

Figure 11A:
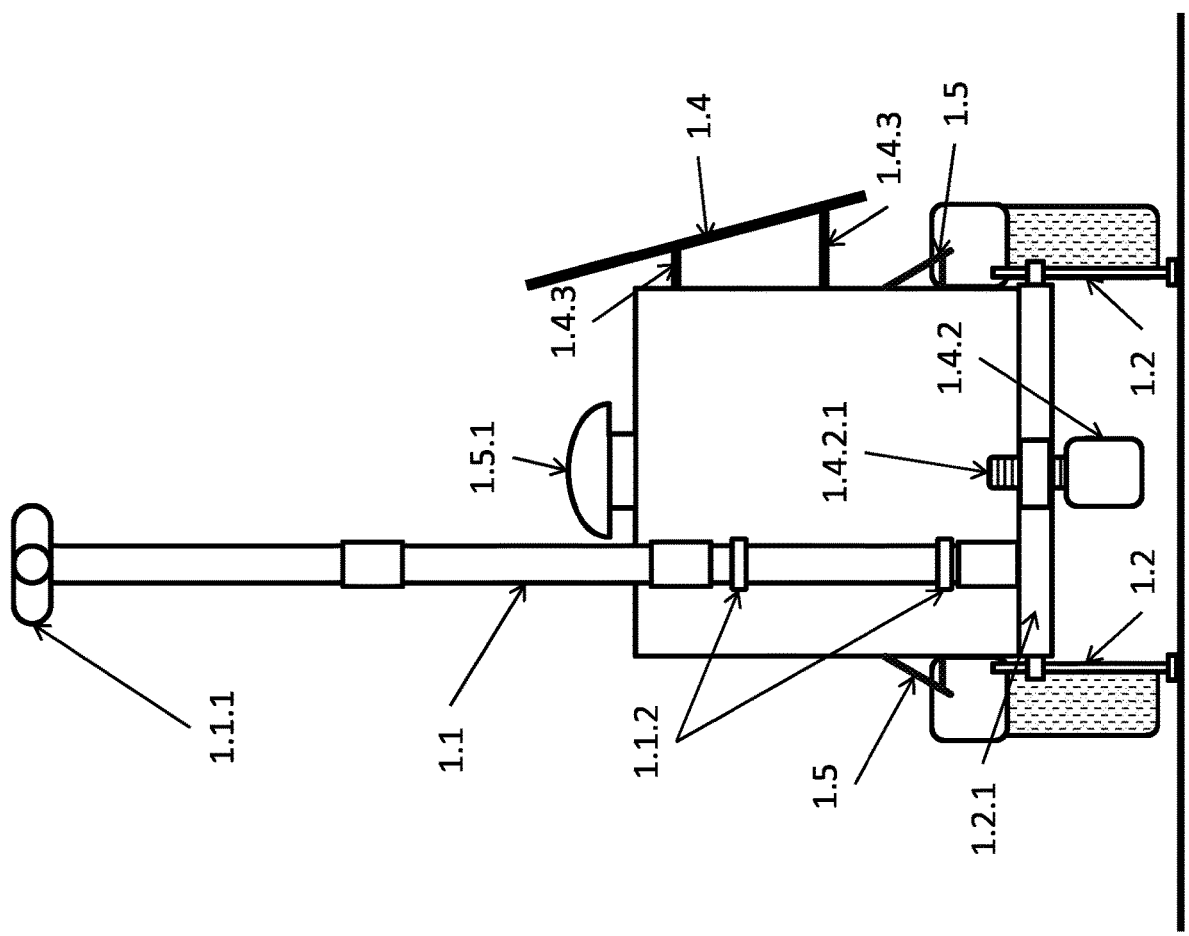
FIGS. 11A and 11B illustrate a front elevation and a rear elevation of the deployed pod.
Figure 11B:
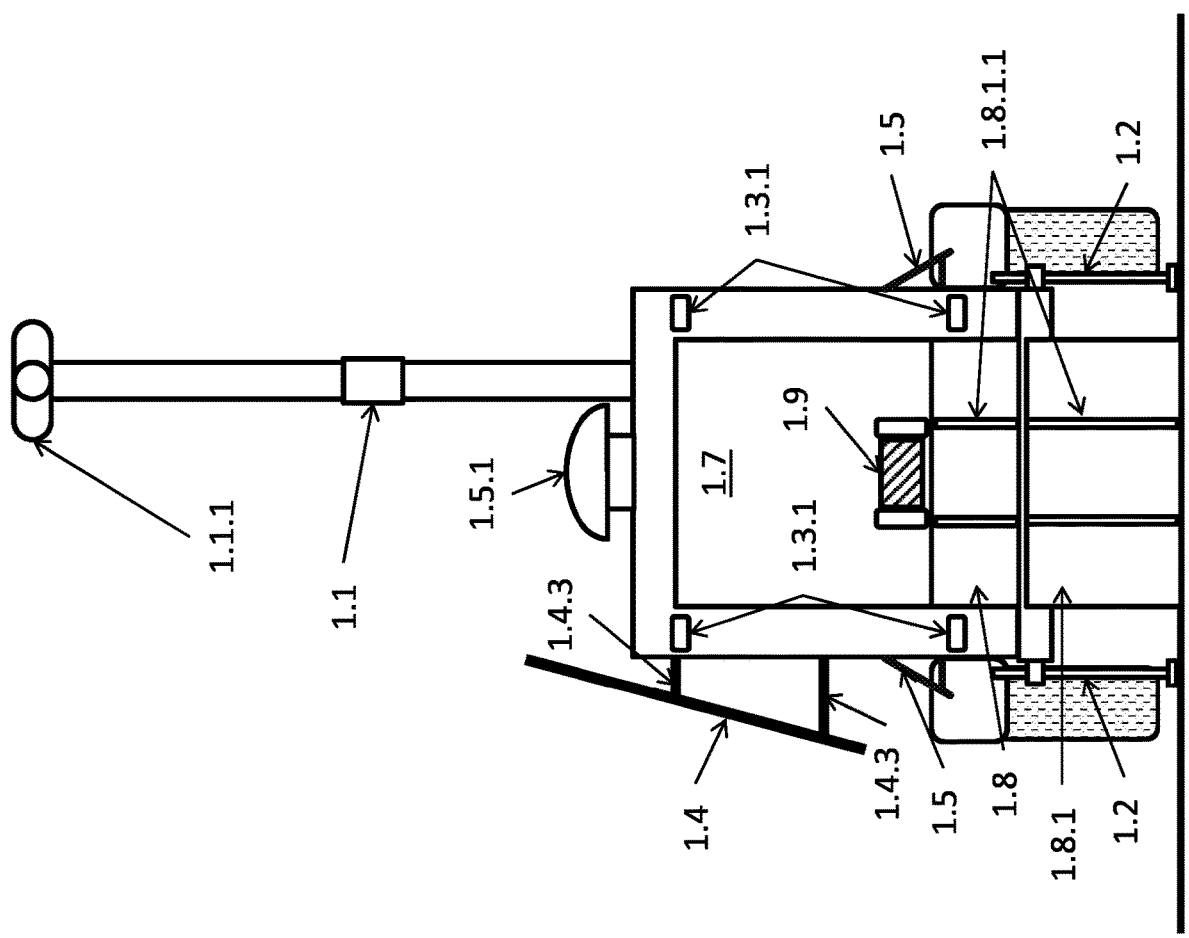

Referring to FIG. 11A and FIG. 11B, a front elevation and a rear elevation of the deployed pod is shown. Referring to FIG. 11A, the front elevation shows the pod raised and leveled on its corner stabilizing pedestals 1.2 with its sensor mast 1.1 erected and secured by upper and lower restraining brackets 1.1.2, and its sensor cap 1.1.1 is mounted atop the mast. The roof convection exhaust 1.5.1 is shown atop the pod and the lower convection awning vents 1.5 have been swung and locked open. The side solar panels 1.4 are mounted in their adjustable brackets 1.4.3. The pod's charging plate is mounted in its height adjustable bracket 1.4.2.1, which is mounted into the trailer receiver channel at the middle of the front deck 1.2.1.

Referring to FIG. 11B, the rear elevation also shows the pod raised and leveled on its corner stabilizing pedestals 1.2, and the sensor mast 1.1 is visible with the sensor cap mounted atop the erected mast. The roof convection exhaust 1.5.1 is shown atop the pod and the lower convection awning vents 1.5 have been swung and locked open. The side solar panels 1.4 are mounted in their adjustable brackets 1.4.3. The upper and lower tail light assemblies 1.3.1 are shown, and the pod's rear door ramp 1.8.1 has been lowered to reveal the cargo bay's interior 1.7 without the rover, which has already been unloaded. The cargo winch 1.9 is visible, as is the inclined cargo bay floor 1.8. The longitudinal inside track guide rails 1.8.1.1 are also indicated. These are set to the width of the rover's inner wheel track, so that they guide the rover's travel by constraining lateral motion along the inner sidewalls or its drive wheels. This ensures safe loading and unloading, and the rails add stiffness to the ramp door and the pod floor.

Figure 12:
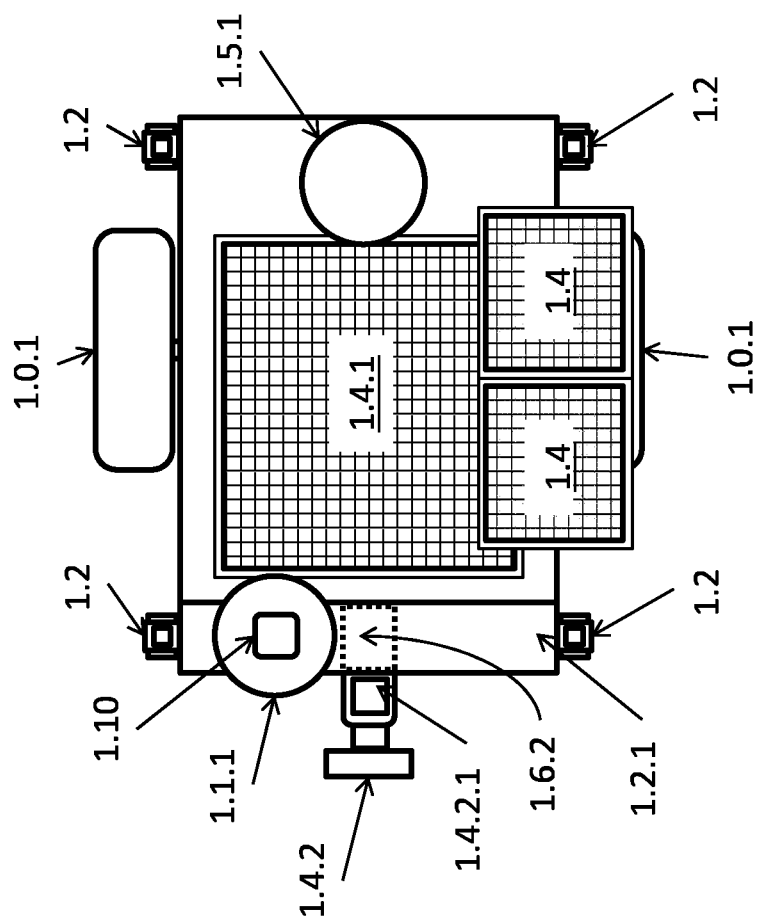
FIG. 12 illustrates a top view of the deployed pod.

Referring to FIG. 12, a top view of the deployed pod is shown. In this view the pod's deployed side solar panels 1.4 are visible, as is the optional roof panel 1.4.1. Also showing are the pod's trailing wheel fenders 1.0.1, the roof convection exhaust cap 1.5.1, and the four corner stabilizing pedestals 1.2. The front deck 1.2.1 is also visible, as is the sensor cap 1.1.1. The pod's RTK base station 1.10 is shown mounted atop the sensor cap. The pod's transmission charging plate 1.4.2 and its height adjustment bracket 1.4.2.1 are shown anchored into the pod's chassis receiver channel 1.6.2.

Figure 13:
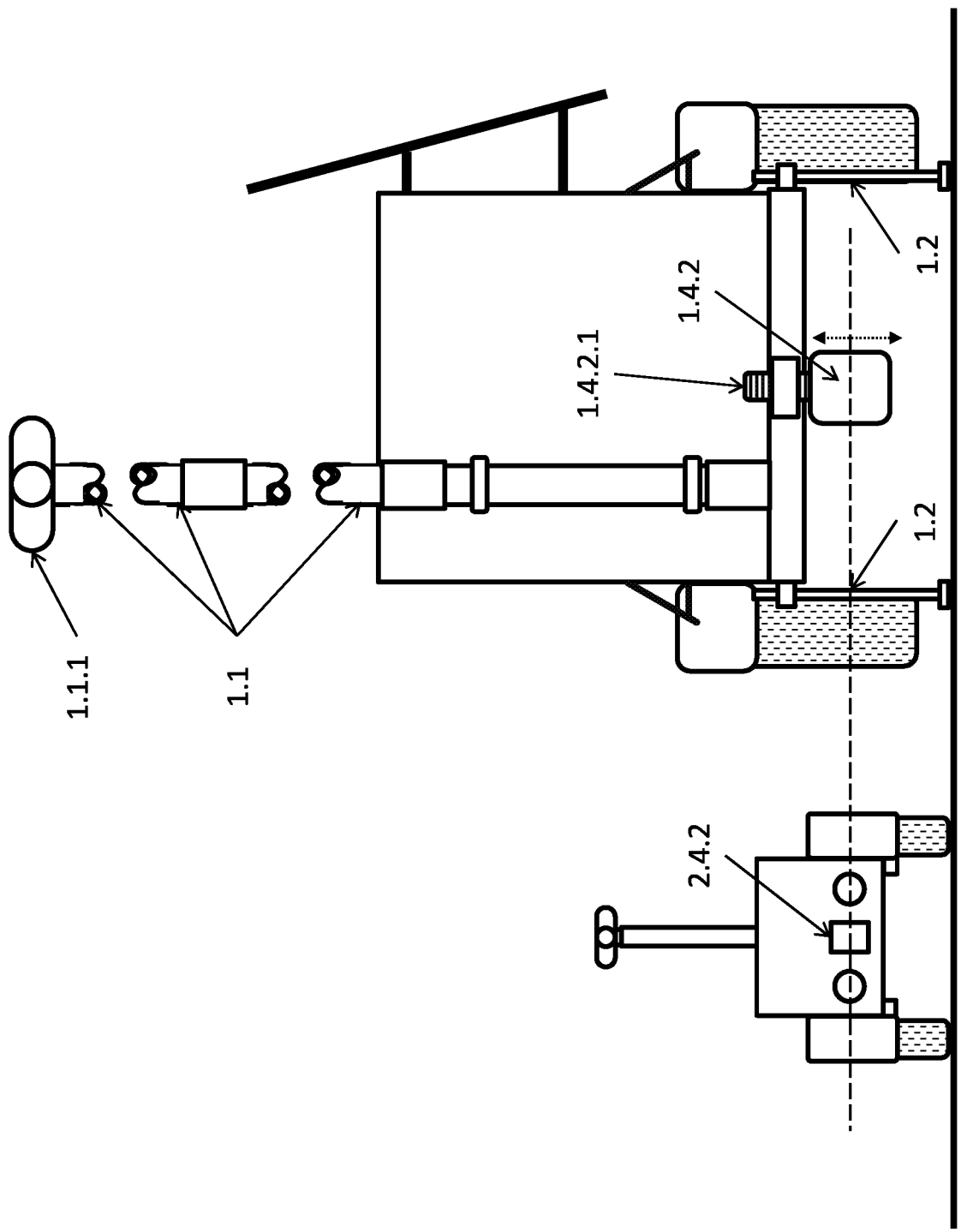
FIG. 13 illustrates a vertical alignment of a pod's charging plate with a rover's plate.

Referring to FIG. 13, a vertical alignment of the pod's charging plate with rover's plate is shown. This view shows that the height of the pod's transmission charging plate 1.4.2 can be brought into vertical alignment with the rover's receiver charging plate 2.4.2 by use of the height adjustment bracket 1.4.2.1. Height adjustment is indicated by the vertical arrow, and vertical alignment is indicated by the horizontal dashed line through the charging plates. The rover is responsible to bring its charging plate into horizontal alignment and into proximity with the pod's charging plate with sufficient area overlap to effect the rover charging process.

Figure 14:
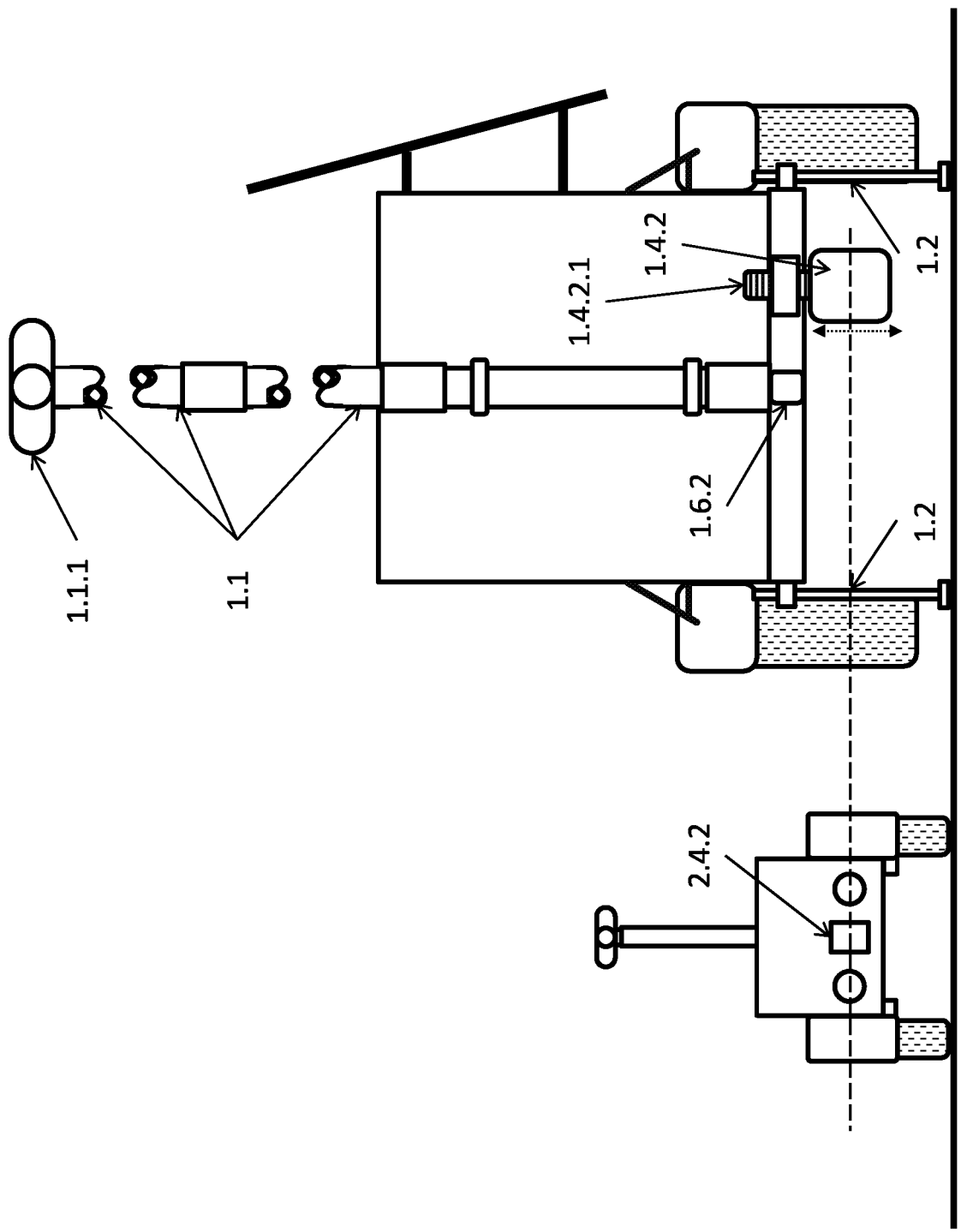
FIG. 14 illustrates an alternative placement of the charging plate transmitter.

Referring to FIG. 14, an alternative placement of the charging plate transmitter is shown. The pod's charging plate transmitter 1.4.2 is positioned to one side of the towing channel receiver 1.6.2. Using a second receiver for the charging plate's bracket 1.4.2.1 allows it to be pre-fitted with a wiring harness that speeds setting up the charging system. This also reduces wear on receiver contact points that may result from repurposing the channel receiver for both towing and charging. The sensor mast may also be repositioned to the center of the front deck.

Figure 15A:
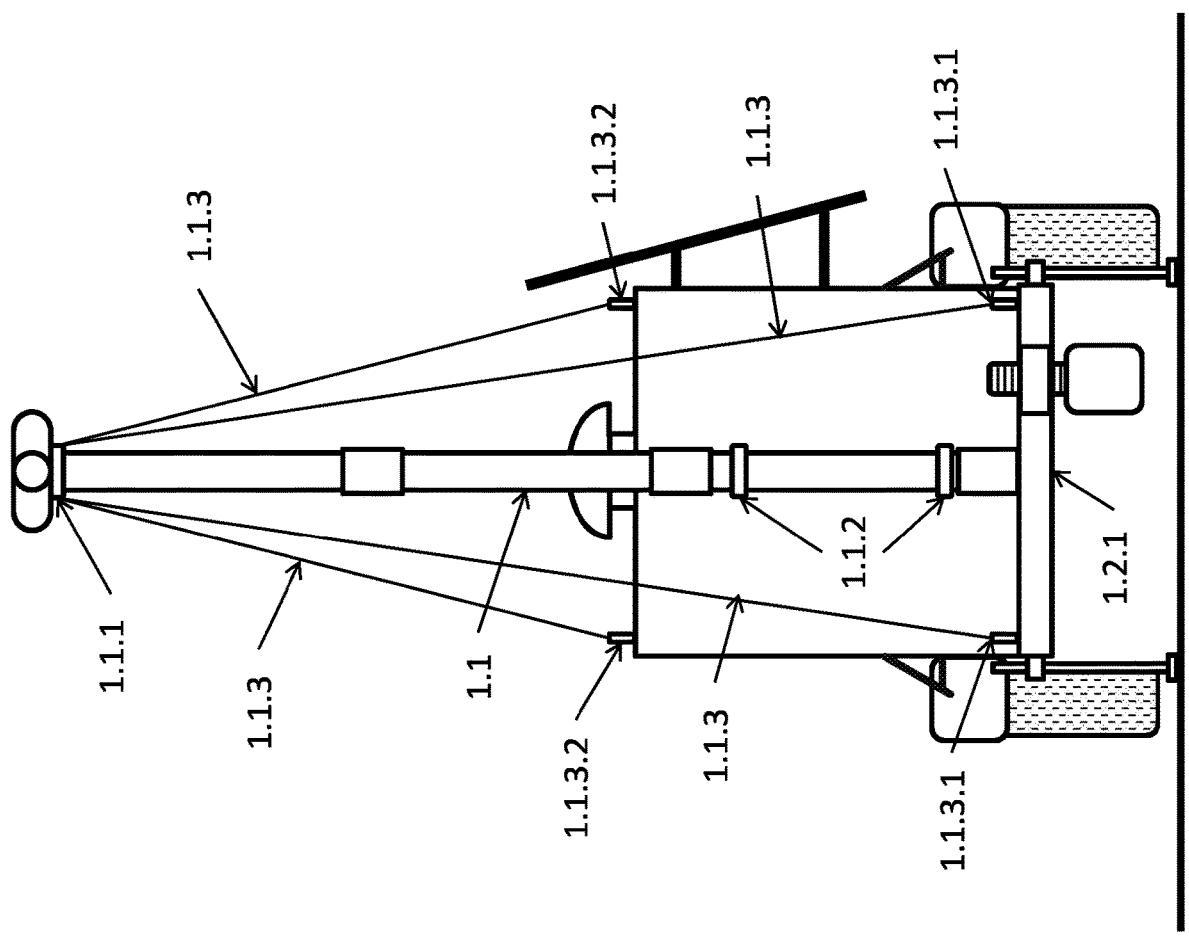
FIG. 15A and FIG. 15B illustrate a front elevation and a top view of sensor mast guy wires.
Figure 15B:
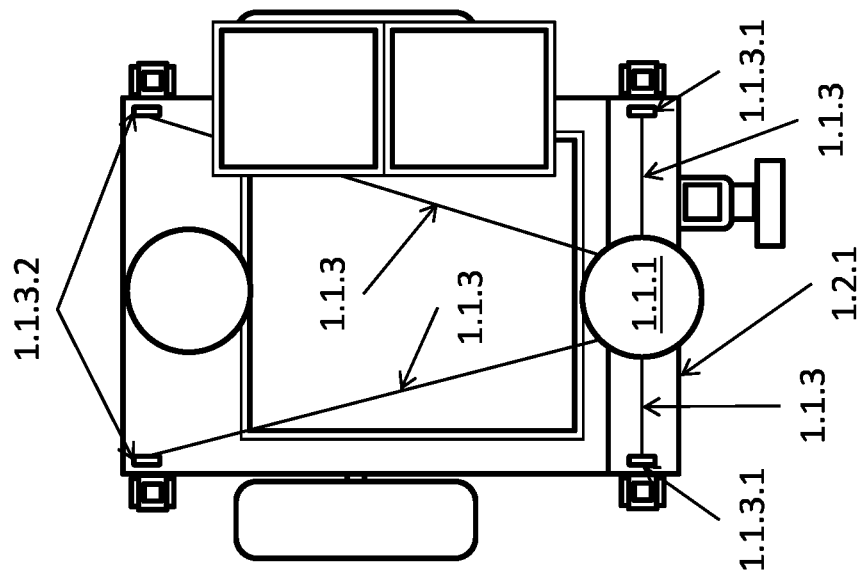

Referring to FIG. 15A and FIG. 15B, the sensor mast guy wires front elevation and top view are shown. Referring to FIG. 15A, in the front elevation, the erected pod sensor mast 1.1 is shown secured by the restraining brackets 1.1.2, and it is further stabilized by a set of guy wires 1.1.3. Two wires attach to deck anchors 1.1.3.1 located at port and starboard positions of the forward deck 1.2.1. Two other wires attach to roof anchors 1.1.3.2 located at port and starboard positions at the rear of the pod roof. The upper ends of the guy wires anchor to the base of the sensor cap 1.1.1. These wires are intended to alleviate sway of the sensor cap.

Referring to FIG. 15B, the same features are shown in top view. Two guy wires run from the base of the sensor cap 1.1.1 to deck anchors 1.1.3.1 at port and starboard positions on the forward deck 1.2.1. Another two wires run from the sensor cap base to roof anchors 1.1.3.2 at port and starboard positions at the rear of the pod roof.

Figure 16:
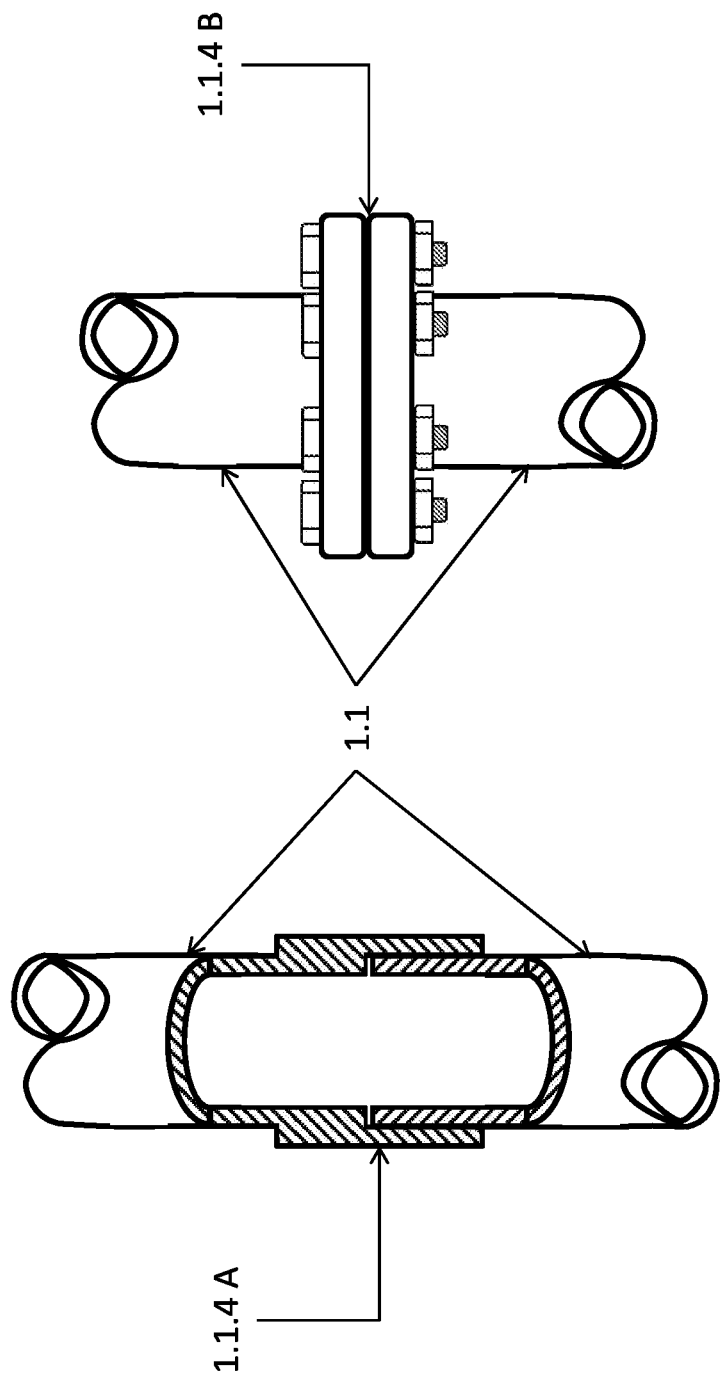
FIG. 16 illustrates alternative embodiments of pod mast section joints.

Referring to FIG. 16, alternative embodiments for joining the pod's mast sections 1.1 are shown. The left-side cutaway shows two mast sections joined by an overlapping collar 1.14 A, which forms part of the lower end of each mast section. Sections are joined by inserting the top of one section into the collar base of another section. Assembly is thereby not complex and is rapid. A Teflon wrap, spray, or the like at the interface facilitates disassembly.

Referring to FIG. 16, the right-side drawing shows sections joined by bolted flanges 1.1.4 B located at each end of a mast section. To join two sections requires aligning corresponding bolt holes and inserting and tightening a bolt-nut assembly for each hole. While assembly may be more time consuming than with the collar, the join may be more stable. A gasket at the interface facilitates disassembly.

Figure 17:
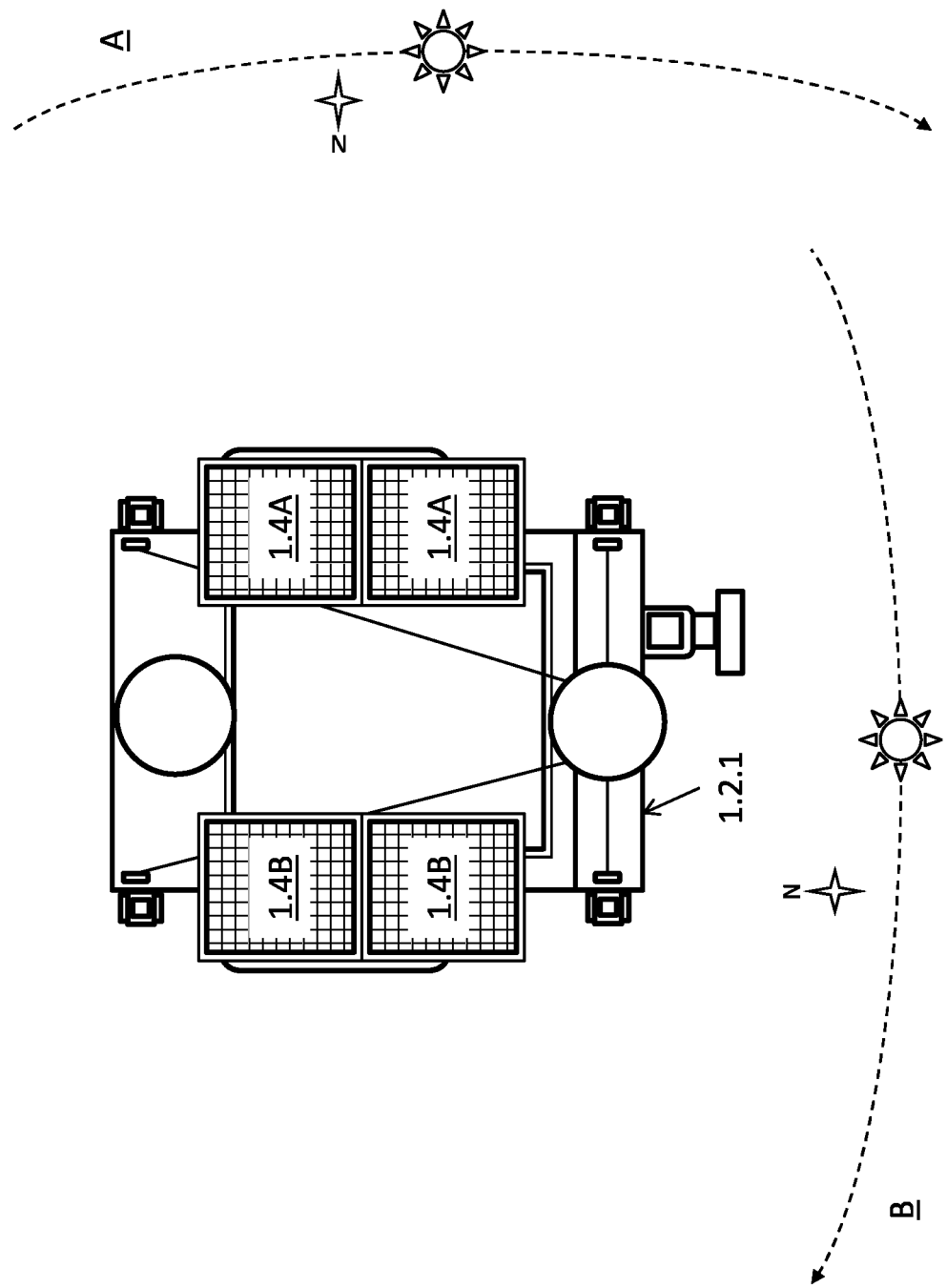
FIG. 17 illustrates a single side mounted and bilateral mounted solar panel configurations.

Referring to FIG. 17A/B, illustrates mounted solar panel configurations, for single side mounted and bilateral mounted. The panels 1.4A are mounted on a single side of the pod (i.e., port side). This is the configuration illustrated in previous figures, but starboard mounting is also feasible. In this configuration, the pod is oriented so that the side on which the panels are mounted faces the sun's direction (i.e., southward in the northern hemisphere).

The original panels 1.4A and additional panels 1.4B are mounted bilaterally (i.e., on both the port and starboard sides). In this configuration, the pod is oriented so that the sun's arc crosses from one set of side panels to the other. This configuration shows the pod oriented with its front (indicated by its forward deck 1.2.1) facing the sun's direction, so the sun crosses from port to starboard. The pod may also be oriented with its aft facing the sun.

Figure 18:
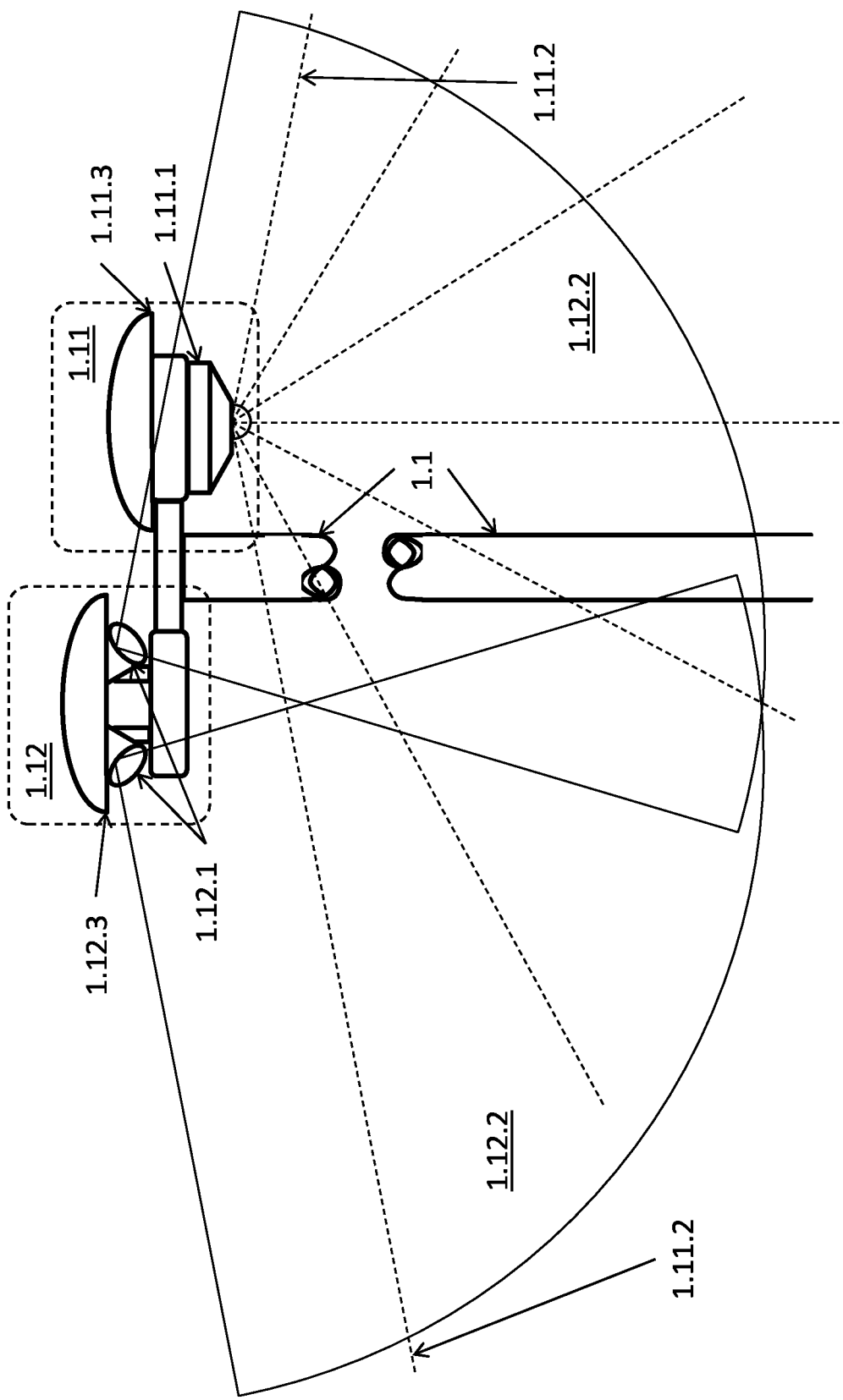
FIG. 18 illustrates a side elevation of sensor cap surveillance camera and lighting rigs.

Referring to FIG. 18, the sensor cap, the surveillance camera, and the lighting rigs from a side elevation are shown. One embodiment of the pod's sensor cap 1.1.1 is shown. One embodiment of the surveillance camera rig 1.11 comprises a single downward-facing 360° omni-camera unit 1.11.1 with integrated 2-way audio and protected by a weather cap 1.11.3. The rig is mounted away from the mast 1.1 so as to provide a downward pose and minimize visual obstruction by the mast. The camera's field of view is illustrated by the pencil of dashed rays 1.11.2 passing through the camera focal point. This embodiment shows a quad lamp surveillance lighting rig 1.12 mounted in opposing position above the cap's armature so as to counterbalance the camera rig. In this embodiment, the rig consists of 4 lamps, two of which are visible 1.12.1, and the lighting rig is similarly protected by a surmounting weather cap 1.12.3. Lamps are preferably oriented at approximately 45, 135, 225, and 315 degrees relative to the pod's longitudinal axis to provide omni-directional coverage. By placing the lamps above the camera and orienting them outward and downward the overlapping lighting flood fields, illustrated by the outlined fan shapes 1.12.2, they are able to illuminate the scene without directly impinging on the camera's lens—thereby reducing glare. The arc outlines generally illustrate the angular sweep of the illumination, but should not be considered limits on illumination distance.

A similar configuration may be used for the rover's sensor cap.

Figure 19:
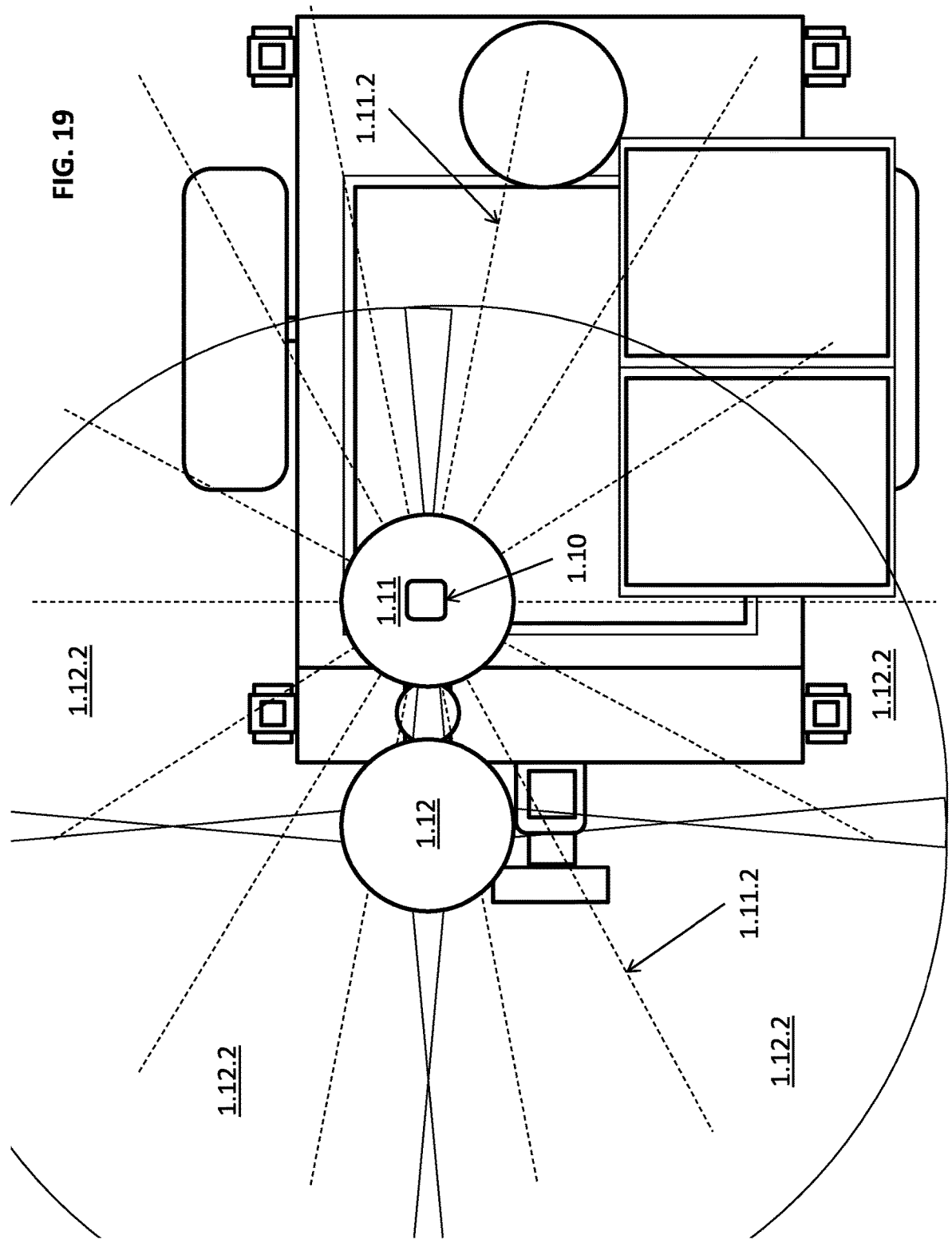
FIG. 19 illustrates a top view of the sensor cap surveillance camera and lighting rigs.

Referring to FIG. 19, a top view of the sensor cap, the surveillance camera, and the lighting rigs are shown. The pod's surveillance camera rig 1.11 is seen from above, and its 360° field of view is illustrated by the pencil of dashed rays 1.11.2 passing through the camera's focal point. For clarity, only two of the infinite number of rays in the pencil are labelled. The lighting rig 1.12 is also shown from above. The four overlapping lighting flood fields are illustrated by the outlined fan shapes 1.12.2. In practice the illumination extends beyond the arc limits illustrated.

Figure 20:
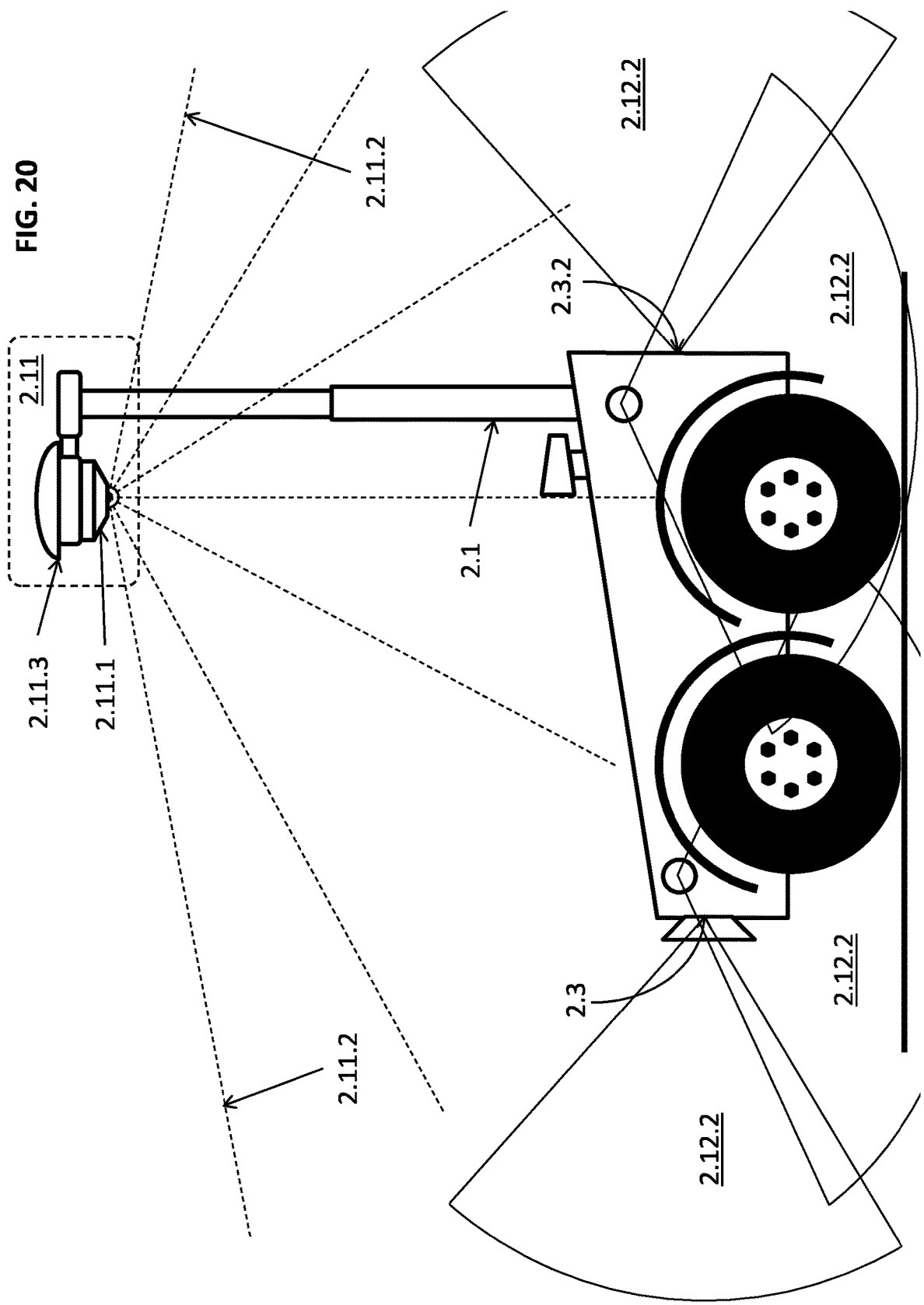
FIG. 20 illustrates a side view of a rover camera and lighting configuration.

Referring to FIG. 20, a side view of an alternative embodiment of the rover camera and the lighting rig configuration is shown. The integrated downward facing omni-camera unit 2.11.1 and its weather shield are mounted atop the sensor mast 2.1 as components of the sensor cap 2.1.1. The camera's field of view is illustrated by the pencil of dashed rays 2.11.2 passing through the camera focal point. However, the lighting rig in this embodiment is distributed about the body of the rover. It exploits the existing headlights and backup lights for illumination fore and aft of the vehicle, and it adds side surveillance lamps 2.12.2 to illuminate the port and starboard areas about the vehicle. By placing the lamps below the camera and orienting them outward and downward the overlapping lighting flood fields are able to illuminate the scene without directly impinging on the camera's lens—thereby reducing glare. The overlapping illumination fields are illustrated by the outlined fan shapes 2.12.2.

At night, the headlights are preferably on during driving; the backup lights are additionally lit when the rover is reversing or surveilling; and the side surveillance lights are added when the rover is in surveillance mode.

Figure 21:
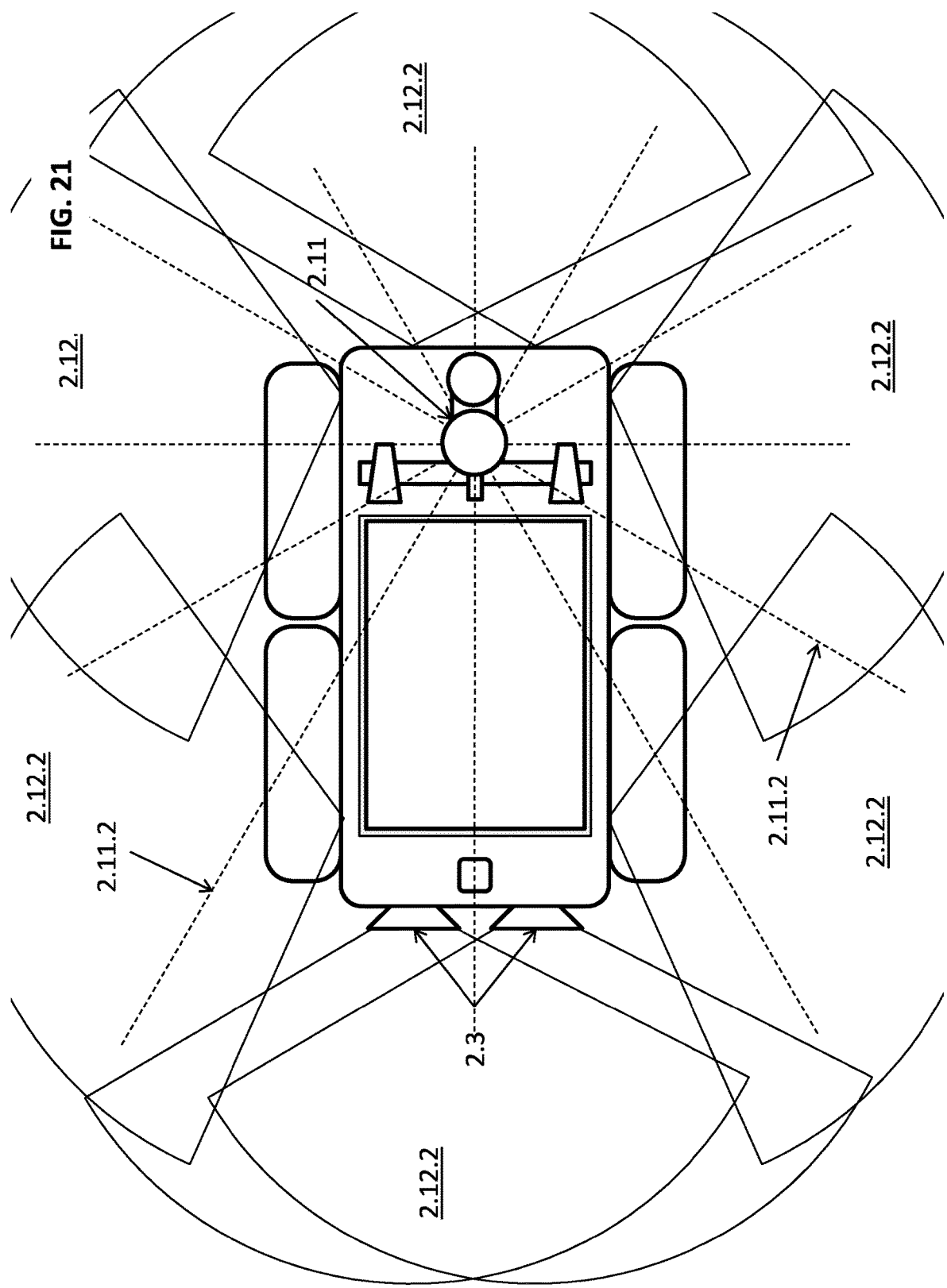
FIG. 21 illustrates a top view of the rover camera and lighting configuration.

Referring to FIG. 21, a top view of the rover camera and lighting configuration is shown. The same alternative embodiment of rover's camera and lighting rigs is shown from above. The overlapping surveillance illumination fields are illustrated by the outlined fan shapes 2.12.2. The omni-directional camera's field of view is illustrated by the pencil of dashed rays 2.11.2 passing through the camera's focal point.

Figure 22:
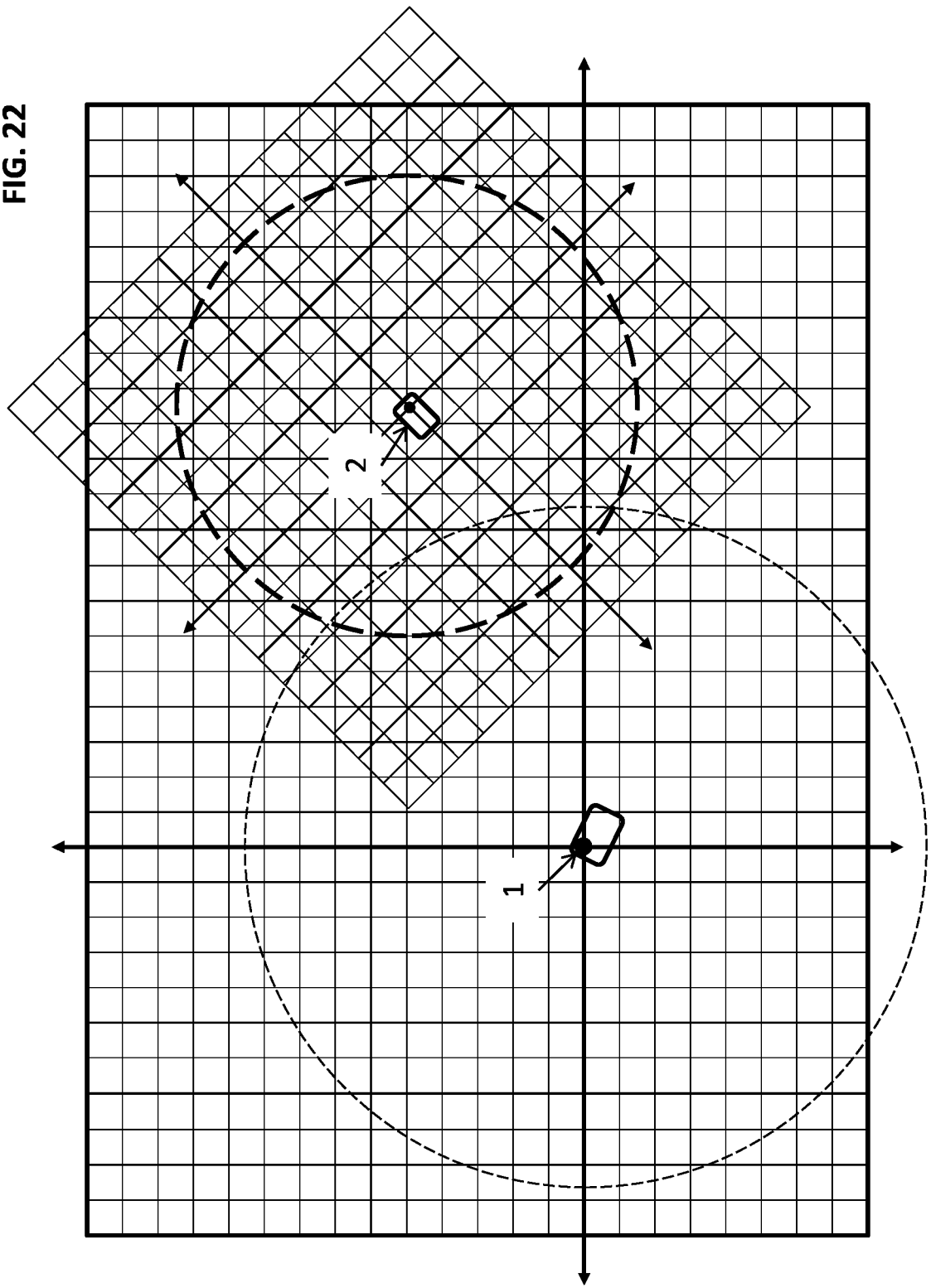
FIG. 22 illustrates pod and rover coordinate frames and FOVs.

Referring to FIG. 22, the pod and rover coordinate frames and FOVs are shown. FIG. 22 illustrates how the pod 1 maintains a local coordinate system (i.e., large grid) relative to the surveillance zone with the ground plane projection of its sensor cap center as the origin. That origin is geo-referenced so that any point within the zone can be reconciled into global latitude-longitude coordinates. FIG. 22, also illustrates the rover's own local coordinate system (i.e., diagonal grid) with the ground plane projection of its sensor cap center as origin. Thus any event detected by the rover is localized relative to its local coordinate system. And that location can be mapped to zonal coordinates by the pod as the rover's location and pose are known in zonal coordinates. This allows triangulation within the zone, and the global geo-referenced mapping allows coordination across zones. The visual sensing range of each agent is illustrated by a dashed circle centered on its respective sensor cap. FIG. 22 also illustrates that in general neither agent is able to "see" the entire zone on its own, but by working together the zone may be successfully surveilled.

Figure 23A:
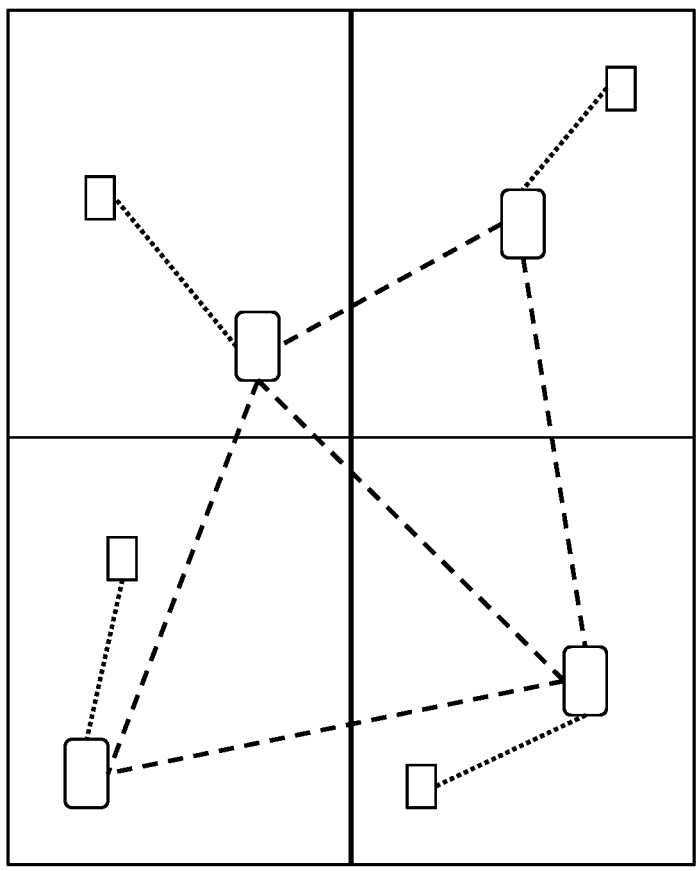
FIG. 23A, FIG. 23B, and FIG. 23C illustrate inter-zone coordination.
Figure 23B:
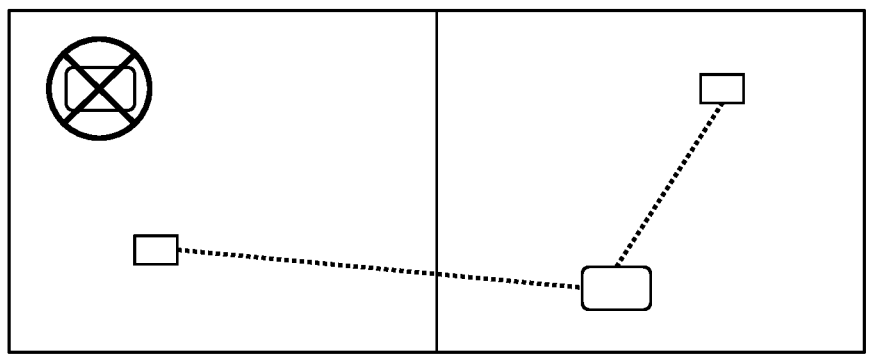
Figure 23C:
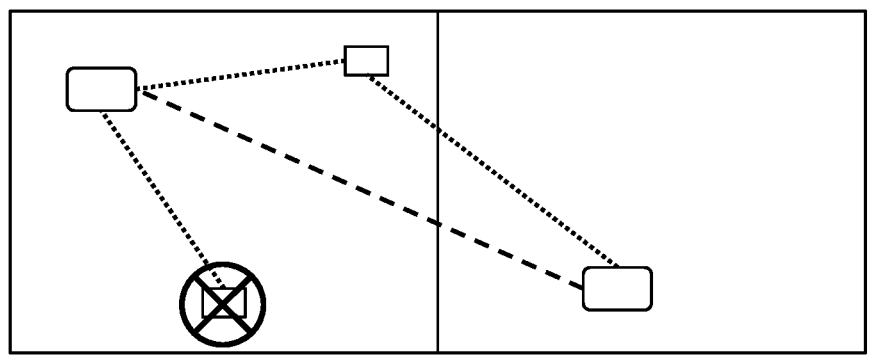

Referring to FIG. 23A, FIG. 23B, and FIG. 23C, illustrates inter-zone coordination. FIG. 23A illustrates a site divided into multiple zones with one duo surveilling each zone (pods are indicated by larger rectangles and rovers are indicated by smaller rectangles). There is communication and mission coordination between each pod-duo pair (indicated by the dotted lines). There is also sparser communication and coordination between neighboring pods (indicated by the dashed lines). This communication is both pulse-driven at regular intervals to maintain synchrony and event-driven as desired. For example, a significant event detected in one zone may trigger metadata forwarding to a neighboring zone, if it is predicted to cross into that neighbor's territory. This enables anticipatory processing, which may provide more effective surveillance of the entire site.

Referring to FIG. 23B, an exemplary recovery strategy in the case of a pod failure is shown. The failed pod's orphaned rover is temporarily adopted by a neighboring pod until such time as the mother pod can be repaired or replaced.

Referring to FIG. 23C, another exemplary recovery strategy in the case of a rover failure is shown. The now childless pod, communicates with a neighbor pod to temporarily share its rover until the downed rover can be repaired or replaced. In this example, the direct communication between the shared rover and its new step parent is shown. This may be more efficient in some cases, but may also result in contention that is mediated by the shared rover. Another technique is to have the childless pod issue indirect rover requests to the neighbor pod, who arbitrates the servicing of these sharing requests. This avoids contention, but may not be as time-efficient.

As illustrated and previously described, the system may include the autonomous surveillance duo comprising a stationary pod robot component (see 1 of FIG. 1) and a mobile rover robot component (see 2 of FIG. 2) that perform cooperative, joint site surveillance. The duo is responsible to surveil a designated subarea within the site, termed a surveillance zone, which is specified at setup time and is typically delimited by the physical characteristics of the site and the sensing capabilities of the duo. Multiple duos may therefore be required to surveil the entire site.

Duo surveillance may be a cooperative computation performed by a pod/rover pair. The pod/rover pair may detect and record significant zonal events within a common event database, and optional transmission of such event logs to an associated cloud for archiving and deeper analysis. The pod/rover pair may include heterogeneous, joint SLAM (simultaneous localization and mapping), which supports the progressive refinement of non-transient zonal features (landmarks, structures, terrain, vegetation, water bodies, etc.) within a common map database. Additional site-specific mission tasks such as: operator-specified "go-to-and-investigate" a specific location/event; traversing designated patrol routes; waypoint visitation; entry-point monitoring; gauge reading; and overall zonal situation awareness may be included.

The pod component may be positioned at a predefined, advantageous location within a designated zone to be surveilled, and it performs stationary surveillance of those zonal sub-regions that fall within range of its sensors—minimally visual and audio sensors. In one embodiment, the pod has a sectioned mast that is assembled and erected during deployment (see, FIG. 1 (1.1)); and a cluster of sensors is located in a sensor cap (see, FIG. 1 (1.1.1)), which is mounted atop the mast. The sensor cap may also house a lighting rig (See, FIG. 18 (1.12)) to enable nighttime surveillance operations. In addition, the sensor cap houses a differential GPS base station (See, FIG. 12 (1.10)), which aids in accurate localization of the rover. Once assembled, the sensors sit high enough above ground to provide good visibility of the zone and good reach for the GPS signal. In addition, the pod's imposing visual presence acts a deterrent to malefactors.

The pod performs as a local mission manager. Once positioned, it provides the origin of a local zonal coordinate system, and thus it supports integration of the data collected by both it and the rover. This integrated data provides a consistent assessment of the state of the surveilled zone. Because the pod is stationary, it can be accurately geo-referenced so that the data gathered by one zonal duo can be consistently integrated with the data of other duos operating in different zones on the site.

The pod also serves as a transport capsule so that the duo can be rapidly deployed to any desired surveillance location. The pod is effectively a trailer with hollow bay (see, FIG. 3 (1.7)) housing major hardware and mechanical systems components including: computational and communication units; electrical charging and storage units; and environmental maintenance components. A detachable tongue (See, FIG. 2 (1.6)) allows the pod to be hitched to a service vehicle, which tows the duo to the site. The pod's hollow interior further provides a secure lockdown station for the rover (see, FIG. 3 (2)) during transport. The pod's rear drop-down hatch serves as a loading/unloading ramp (see, FIG. 7 (1.8.1)) for the rover. Two longitudinal side rails spaced at the interior track width of the rover (see, FIG. 7 and FIG. 11B (1.8.1.1)) guide the rover's wheels during loading/unloading, keeping the rover properly aligned and prevent its reduce the likelihood off the side of the ramp. These rails also add strength and stiffness to the hatch/ramp.

Once the pod is positioned, solar charging panels (see, FIG. 1 (1.4)) are unloaded from the cargo bay, and they are affixed to the pod on exterior mounting racks (see, FIG. 11A (1.4.3) and FIG. 11B (1.4.3)). The pod may be reoriented by manual dollying (see, FIG. 6) to provide maximum solar exposure. Depending on panel configuration the pod would be oriented as illustrated in FIG. 17A/B. The pod is then raised and leveled on four corner pedestals (see FIG. 1 and FIG. 11 (1.2)) to provide an unmoving and stable reference platform for the duo's surveillance tasks. The towing tongue (see, FIG. 4 (1.6)) is detached and stowed inside the locked cargo bay, thereby preventing easy theft of the unit.

The pod further serves as a charging platform for both itself and the rover. With the pod is in its final position, the pod's rover-charging station (see, FIG. 11A) is deployed and activated. The height of the pod's charging plate is adjusted via an adjustment bracket (see, FIG. 13 (1.4.2.1)) to match that of the rover (see, FIGS. 13 (1.4.2 and 2.4.2 respectively)). At this point, the rover may "dock" with the charging station in order to locate and memorize the station's coordinates within its map coordinate system. Docking consists of positioning the rover so as to bring its charging plate into close proximity with the pod's charging plate. Visual fiducials may be used to facilitate the process. Once a satisfactory position is achieved, power transfer can be initiated via the proximity charging subsystem. However, the initial docking operation is typically focused only on confirming location of the charging station, since the duo normally arrives on site with both the pod and the rover fully charged. Charging of both robot components is automatically maintained by the pod's power management subsystem, which monitors charge/discharge rates for both robot agents, and requires no human intervention to maintain proper charge levels. Power is collected from solar panels affixed to the pod, and is optionally supplemented or replaced by line source when available. Charge is stored in a bank of batteries that provide power for the pod's own systems and act as a reservoir from which the rover's batteries can be recharged.

For emergency situations, the pod can remain attached to the service vehicle (see, FIG. 2), drawing extra power from the service vehicle as needed. This scenario avoids the need to deploy solar panels and allays any concerns about power exhaustion in an emergency.

The duo model also supports the case where only the pod (no rover) is deployed at the scene. The sensor mast and cap are erected, and the pod may be drawn behind the service vehicle and positioned at various locations where desired— as a sort of ersatz "rover". This provides extremely fast deployment for time critical emergency situations.

The rover component is an autonomous ground vehicle (AGV) that initially disembarks from the pod and calibrates its map coordinate system with that of the pod using a combination of sensor modalities including vision, GPS, LIDAR, IMUs, and/or visual fiducials on the pod. The rover also localizes the pod charging station as indicated above so that it may reliably return and recharge as desired.

Stereo SLAM software and a stereo camera rig (see, FIG. 9A, FIG. 9B, and FIG. 10 (2.2)) is mounted on the roof of the rover allow it to navigate autonomously. Localization is improved by a differential GPS transceiver (see, FIG. 10 (2.10)) positioned at the top-front of the rover and linked to the RTK base station on the pod. Map calibration allows the rover's mobile surveillance to be coordinated with that of the pod (see, FIG. 22).

In addition to navigational cameras and sensors, the rover possesses a telescoping mast (see, FIG. 9A and FIG. 9B (2.1)) capped by a sensor cluster housing an omni-directional camera (or a plurality of cameras with overlapping FOVs). The mast may be programmatically raised or lowered as needed to provide good visibility of zonal events. The mast may also be raised and lowered manually via a remote control app that provides full teleoperation of the vehicle when manual override is desired. Rover surveillance is performed according to predefined mission directives and in response to events detected and/or pod issued interrupts.

The rover monitors its own power levels and shares this data with the pod. Optionally, the rover has a solar panel embedded in its roof (see, FIG. 10 (2.4.1)) to supplement its power reserves and prolong its duty cycle between recharges. Based on the current state of the rover battery and the pod recharge reservoirs and based on predicted rover depletion rates and predicted pod reservoir charging rates, the duo jointly plans a recharge strategy including timing, residual rover tasking, and routing back to the pod charging station. Accordingly the rover autonomously navigates back to the charging station to perform unattended charging when needed.

Daytime surveillance strategies are generally outlined previously. The pod and the rover exploit ambient illumination to perform visual surveillance and video capture during daylight hours. In areas of deep shadow, the rover may temporarily switch on lights for driving or to surveil.

Daytime power management strategies are also generally outlined previously. Both the pod and the rover maintain estimates of their individual power consumption rates and replenishment rates. The rover's data is forwarded to the pod whose power management subsystem estimates the optimal recharge scenario (timing and routing), based on the current rover tasking schedule, anticipated recharge rates, and/or predicted power usage curves.

During nighttime, the rover uses driving lights to visually navigate, and it may use additional illumination (see, FIG. 20 and FIG. 21) to perform its surveillance tasks. Mission tasking, especially for the rover, may be adjusted opportunistically to prolong the duty cycle between recharges. For example, rover patrols may be performed at less frequent intervals, or the routes themselves may be adjusted so that lower priority waypoints are visited less frequently. Another choice is to switch on illumination only when surveilling at waypoints.

Because lights are generally used to surveil at night, power consumption should be more carefully monitored, and more conservative consumption strategies may be adopted. More especially, the solar panels will not be generating any additional power reserves. Apart from rover driving lamps, surveillance illumination may be event-driven. For example, lights for both the pod and the rover may be switched on by motion triggers and switched off with lack of motion. Another choice might be to use lower-powered IR LEDs as nighttime illumination.

As generally outlined previously, multiple duos may be used to adequately cover an entire site. This means that a duo may coordinate with other duos in neighboring zones to improve surveillance capability over the entire site and to overcome individual component failures. Some examples of inter-zone coordination are illustrated in FIG. 23A, FIG. 23B, and FIG. 23C.

With event forwarding (see, FIG. 23A) metadata for significant events that cross from one zone to another may be opportunistically sent from the originating zone to the pod of the predicted destination zone. This effectively implements a simple ad-hoc sensor net over all zones.

With pod failure (see, FIG. 23B), a rover adoption procedure may be performed. When a pod fails, the orphaned rover may be temporarily adopted by the pod of a neighboring zone, relying on the adoptive parent for control, coordination, and recharging until repairs can be completed or until a replacement duo can be deployed.

With rover failure (see, FIG. 23C), a rover sharing procedure may be performed. When a rover fails, the childless pod may temporarily share the rover of a neighboring zone, coordinating with the "real" parent to supply control, coordination, and recharging until repairs can be completed or until a replacement duo can be deployed.

As previously described, the rover and pod enable flexible deployment of visual surveillance components where and when needed. It also facilitates the components being readily reconfigured as the surveillance requirements evolve over time. Nevertheless, the data and metadata preferably comply with existing surveillance data conventions, such as PSIM (Physical Security Information Management) and CSIM (Converged Security Information Management), so it readily integrates with existing installs.

Pairing of heterogeneous agents (pod-rover duo) integrally blends the individual strengths of stationary and mobile surveillance while mitigating their respective weaknesses. The stationary pod provides a reliable visual landmark and geo-referenced coordinate system with which the rover can be more precisely located. Conversely, the moving rover can surveil areas that are hidden from the pod's single stationary vantage point. In addition, both the pod and the rover offer surveillance of areas that may not be available with existing, fixed security installs.

Visual and instrumented triangulation of significant events by the duo pair enables more accurate localization of objects and events within the zone without the need for more expensive modalities like LIDAR. The stationary pod improves its GPS localization by integrating over time, and the pod in turn improves rover localization via differential GPS signaling.

A duo is designed to provide a fully functioning autonomous surveillance solution for a given zone 24/7. Complete and continuous coverage for an entire site can thus be achieved by adding more duos. This is in contrast to previous techniques that employ a patrol model—where agents roam about the site, but are only able to surveil what is in their current field of view.

Enablement of fully autonomous (unattended) charging of both the pod and rover delivers a completely self-sustaining surveillance solution that is cost-effective because it avoids the need for expensive human intervention. This is in contrast to previous techniques, which require periodic human intervention such as battery swaps to maintain functionality.

The design of the pod as a duo transport mechanism (with the rover riding securely inside the pod's cargo bay) supports rapid deployment and ad-hoc surveillance for temporary events and emergency situations.

Rapid deployment also supports rapid and cost effective recovery in the face of component failures (pod or rover). A replacement duo can be quickly rolled-out at minimal effort for urgent or time-critical situations.

Use of existing 4G (and later 5G, etc.) public cellular networks with data encryption provides robust bandwidth for secure transfer of surveillance data. Avoiding the need for a private network install provides increased flexibility, rapid deployment, and reduced complexity. Such high capacity networking also allows the pod and rover to work more efficiently together, and it supports site-wide cooperation among neighboring duos. It further allows offloading more intensive analyses to a cloud service as desired.

Use of open-source software and commercially available, off-the-shelf hardware components reduces delays due to software/component shortages and speeds delivery.

The removable towing tongue allows the duo to be hitched via standard ball hitch to a service vehicle for transport to the site when installed, but when removed and stowed inside the pod's cargo bay prevents easy theft of the duo.

The tow receiver channel that in one embodiment alternatively accommodates a removable towing tongue when deploying and a charge plate transmitter when deployed provides increased flexibility.

The pod door secures the pod bay and its contents when locked up, and when lowered serves as a loading ramp for the rover.

The inclined pod floor exploits gravity to facilitate unloading of the rover when deploying and to provide additional tension against the winch cable when transporting.

The longitudinal inner-track rails (on the door ramp and the inclined floor) guide the rover during loading/unloading and provide structural stiffness to the door (allowing it to be lighter). They also reduce the likelihood of the rover being stuck or damaged during transport and site deployment.

In another embodiment, a set of lights may be located on each of the four corners of the roof of the pod. Each of the lights may be movable and directable, as desired. Having the lights located in a such a position reduces the glare that may otherwise occur.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A surveillance system comprising:
   (a) a stationary pod that acts as a visual landmark and provides a geo-referenced coordinate system together with a pod surveillance system;
   (b) said stationary pod having a pod surveillance area for said pod surveillance system;
   (c) a mobile rover that moves across the ground that includes a rover surveillance system and a location of said mobile rover being referenced by said geo-referenced coordinate system provided by said stationary pod as it said moves across the ground;
   (d) said mobile rover having a rover surveillance area for said rover surveillance system that is different than said pod surveillance area when said mobile rover is spaced apart from said stationary pod;
   (e) said mobile rover transmits sensed rover surveillance data to said stationary pod which receives said rover surveillance data.

2. The surveillance system of claim 1 wherein said stationary pod determines its location based upon a global positioning system using a temporal integration technique.

3. The surveillance system of claim 2 wherein said mobile rover determines its location based upon a global positioning system using a differential signaling technique.

4. The surveillance system of claim 1 further comprising an additional mobile rover that moves across the ground that includes an additional rover surveillance system and an additional location of said additional mobile rover being referenced by said geo-referenced coordinate system provided by said stationary pod as it said moves across the ground, and said additional mobile rover having an additional rover surveillance area for said additional rover surveillance system that is different than said pod surveillance area when said additional mobile rover is spaced apart from said stationary pod, and said additional mobile rover transmits sensed additional rover surveillance data to said stationary pod which receives said additional rover surveillance data.

5. The surveillance system of claim 1 wherein said stationary pod includes a pod solar panel that charges a pod rechargeable power system included with said stationary pod.

6. The surveillance system of claim 1 wherein said mobile rover includes a rover solar panel that charges a rover rechargeable power system included with said mobile rover.

7. The surveillance system of claim 1 wherein said mobile rover includes a controller that autonomously directs said mobile rover to move to a location proximate to said stationary pod to charge a rover rechargeable power system included with said mobile rover from a pod rechargeable power system included with said stationary pod.

8. The surveillance system of claim 1 wherein said stationary pod defines an enclosure sized to enclose said mobile rover, wherein said mobile rover includes a controller that is capable of directing said mobile rover to autonomously leave said enclosure.

9. The surveillance system of claim 8 wherein said enclosure of said stationary pod includes a movable door having a closed configuration and an open configuration, wherein when said movable door is in said open configuration said mobile rover is capable of moving down said movable door onto the ground.

10. The surveillance system of claim 1 wherein said rover surveillance data is transmitted as encrypted data over a cellular network.

11. The surveillance system of claim 1 wherein said stationary pod includes a detachable towing tongue suitable for being detachably interconnected with a ball hitch of a service vehicle, and said stationary pod defines an enclosure sized to enclose said detached towing tongue.

12. The surveillance system of claim 1 wherein said stationary pod includes an adapter for a detachable towing tongue suitable for being detachably interconnected with a ball hitch of a service vehicle and a detachable charge plate transmitter inter-connectable with said adapter.

13. The surveillance system of claim 1 wherein said stationary pod defines an enclosure sized to enclose said mobile rover, wherein said enclosure defines a floor for said mobile rover, wherein said floor is inclined, and said mobile rover includes a controller that is capable of directing said mobile rover to autonomously leave said enclosure.

14. The surveillance system of claim 1 wherein said stationary pod defines an enclosure that includes a movable door having a closed configuration and an open configuration, wherein when said movable door in said open configuration said mobile rover is capable of moving down said movable door onto the ground, wherein said movable door includes a longitudinal track to restrain the path of said mobile rover down said mobile door.

15. The surveillance system of claim 1 wherein said stationary pod and said mobile rover record events within a common database.

16. The surveillance system of claim 15 wherein said stationary pod and said mobile rover include a joint simultaneous localization and mapping supporting progressive refinement of non-transient zonal features within said common database.

17. The surveillance system of claim 1 wherein said rover surveillance system includes both visual and audio sensors.

18. The surveillance system of claim 17 wherein said visual and audio sensors are affixed to an extendable mast attached to said mobile rover.

19. The surveillance system of claim 18 further comprising lighting affixed to said extendable mast.

20. The surveillance system of claim 1 wherein said stationary pod provides an origin of a local zonal coordinate system for said geo-referenced coordinate system.

21. The surveillance system of claim 1 further comprising said mobile rover interconnects with an additional stationary pod when a failure occurs of said mobile rover transmitting sensed rover surveillance data to said stationary pod.

22. The surveillance system of claim 1 wherein said stationary pod includes a line input that charges a pod rechargeable power system included with said stationary pod.

23. The surveillance system of claim 1 wherein said stationary pod includes a mobile service vehicle that charges a pod rechargeable power system included with said stationary pod.

24. The surveillance system of claim 1 wherein said stationary pod includes both visual and audio sensors.

25. The surveillance system of claim 24 wherein said visual and audio sensors are affixed to a mast attached to said stationary pod.

* * * * *